(12) United States Patent
Kawahira et al.

(10) Patent No.: US 11,079,626 B2
(45) Date of Patent: Aug. 3, 2021

(54) LIQUID CRYSTAL DISPLAY DEVICE

(71) Applicant: SHARP KABUSHIKI KAISHA, Sakai (JP)

(72) Inventors: Yuichi Kawahira, Sakai (JP); Koji Murata, Sakai (JP); Takako Koide, Sakai (JP); Masahiro Hasegawa, Sakai (JP); Akira Sakai, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/586,624

(22) Filed: Sep. 27, 2019

(65) Prior Publication Data

US 2020/0103704 A1    Apr. 2, 2020

Related U.S. Application Data

(60) Provisional application No. 62/739,710, filed on Oct. 1, 2018.

(51) Int. Cl.
*G02F 1/13357* (2006.01)
*G09G 5/10* (2006.01)

(52) U.S. Cl.
CPC ......... *G02F 1/133602* (2013.01); *G09G 5/10* (2013.01); *G09G 2360/144* (2013.01)

(58) Field of Classification Search
CPC .............. G02F 1/133555; G02B 6/005; G02B 19/0004

USPC .................................................. 362/600–634
See application file for complete search history.

(56) References Cited

U.S. PATENT DOCUMENTS

| | | | |
|---|---|---|---|
| 2009/0273748 A1* | 11/2009 | Jeong ................ | G02F 1/133602 349/114 |
| 2013/0100096 A1* | 4/2013 | Webster .............. | G09G 3/3466 345/207 |
| 2014/0049731 A1* | 2/2014 | Park ..................... | G02F 1/1303 349/88 |
| 2017/0031206 A1* | 2/2017 | Smith ................. | G02F 1/13363 |
| 2018/0204542 A1* | 7/2018 | Saito ....................... | G09G 5/14 |

FOREIGN PATENT DOCUMENTS

JP       2003-029239 A       1/2003

* cited by examiner

*Primary Examiner* — William J Carter
(74) *Attorney, Agent, or Firm* — ScienBiziP, P.C.

(57) ABSTRACT

A liquid crystal display device includes: a liquid crystal panel; a backlight; an illuminance sensor; and a display controller. The liquid crystal panel includes, in order toward the backlight, an antireflection layer, a first linearly polarizing plate, a first λ/4 retardation layer, a first substrate, a second λ/4 retardation layer, a liquid crystal layer, a second substrate, and a second linearly polarizing plate. The liquid crystal panel has a reflectance within a predetermined range in irradiating the liquid crystal panel with light from an antireflection layer side. The liquid crystal display device satisfies a predetermined relation in the following X and Y, where X (unit: lx) is defined as an environmental illuminance detected by the illuminance sensor, and Y (unit: nit) is defined as a luminance of the backlight, adjusted by the display controller.

6 Claims, 8 Drawing Sheets

1

LIQUID CRYSTAL DISPLAY DEVICE

CROSS-REFERENCE TO RELATED APPLICATIONS

The present application claims priority under 35 U.S.C. § 119 to U.S. Provisional Application No. 62/739,710 filed on Oct. 1, 2018, the contents of which are incorporated herein by reference in their entirety.

BACKGROUND OF THE INVENTION

Field of the Invention

The present invention relates to a liquid crystal display device.

Description of Related Art

Liquid crystal display devices are display devices that use a liquid crystal layer (liquid crystal molecules) for image display (see, for example, JP 2003-29239 A). A typical display method for liquid crystal display devices is that while irradiating a liquid crystal layer sandwiched between a pair of substrates with light from a backlight, a voltage is applied to the liquid crystal layer to change the alignment of liquid crystal molecules, thereby controlling the amount of light passing through the liquid crystal layer.

BRIEF SUMMARY OF THE INVENTION

However, conventional liquid crystal display devices have low visibility (visibility during image display) in bright places such as outdoors. The inventors have made various studies on the cause for the low visibility to find that the luminance in a black display state is increased by the outside light reflection (surface reflection and internal reflection) of a liquid crystal panel constituting the liquid crystal display device, and as a result, the contrast ratio is decreased. The inventors have then, in order to enhance the visibility in bright places, examined greatly increasing the luminance of the backlight to reduce the influence of outside light, but found that it is not possible to achieve low power consumption.

On the other hand, in order to enhance the visibility in bright places (to suppress the outside light reflection), the present inventors have examined disposing a circularly polarizing plate (a laminate of a linearly polarizing plate and a λ/4 retardation layer) on the side opposite to the liquid crystal layer (observation surface side), for the substrate on the observation surface side, of the pair of substrates with the liquid crystal layer sandwiched therebetween in the liquid crystal panel. In order to improve the viewing angle characteristics, however, in a case where a liquid crystal panel in a horizontal electric field mode such as an FFS (Fringe Field Switching) mode or an IPS (In-Plane Switching) mode is employed as the liquid crystal panel, it is difficult to apply a circularly polarizing plate. This is because in a case where circularly polarizing plates are disposed on the observation surface side and the back side of the liquid crystal panel in a horizontal electric field mode, a white (bright) display state is always provided both without any voltage applied to the liquid crystal layer and with a voltage applied thereto, thus making it impossible to achieve a black (dark) display state.

In contrast, the inventors have found, as a configuration, that for the substrate on the observation surface side, of the pair of substrates with the liquid crystal layer sandwiched therebetween, a circularly polarizing plate is disposed on the side opposite to the liquid crystal layer (observation surface side), whereas a λ/4 retardation layer is disposed on the liquid crystal layer side (back side). According to such a configuration, it has been found that a configuration that is optically equivalent to a conventional liquid crystal panel in a horizontal electric field mode is achieved with respect to incident light.

As described above, according to such a configuration, it has been found that a liquid crystal display device with high visibility in a bright place is achieved without greatly increasing the luminance of the backlight, that is, with low power consumption. In order to achieve further low power consumption, however, there has been demand for optimally adjusting the luminance of the backlight within a range that can ensure visibility in a bright place.

The present invention has been made in view of such a current state of the art and aims to provide a liquid crystal display device which is capable of achieving low power consumption while ensuring visibility in a bright place.

(1) One embodiment of the present invention is directed to a liquid crystal display device (hereinafter, also referred to as "a first liquid crystal display device according to the present invention") including: a liquid crystal panel; a backlight; an illuminance sensor that detects an environmental illuminance in a surrounding environment of the liquid crystal panel; and a display controller that adjusts a luminance of the backlight, based on the environmental illuminance detected by the illuminance sensor, the liquid crystal panel including, in order toward the backlight, an antireflection layer, a first linearly polarizing plate, a first λ/4 retardation layer, a first substrate, a second λ/4 retardation layer, a liquid crystal layer, a second substrate, and a second linearly polarizing plate, the liquid crystal panel having a reflectance of higher than 0% and 0.5% or lower in irradiating the liquid crystal panel with light from an antireflection layer side, and the liquid crystal display device satisfying $39.002X^{0.4225} \leq Y \leq 220.42X^{0.2918}$ with $X \geq 70$, where X (unit: lx) is defined as the environmental illuminance detected by the illuminance sensor, and Y (unit: nit) is defined as the luminance of the backlight, adjusted by the display controller.

(2) Another embodiment of the present invention is directed to a liquid crystal display device (hereinafter, also referred to as "a second liquid crystal display device according to the present invention") including: a liquid crystal panel; a backlight; an illuminance sensor that detects an environmental illuminance in a surrounding environment of the liquid crystal panel; and a display controller that adjusts a luminance of the backlight, based on the environmental illuminance detected by the illuminance sensor, the liquid crystal panel including, in order toward the backlight, an antireflection layer, a first linearly polarizing plate, a first λ/4 retardation layer, a first substrate, a second λ/4 retardation layer, a liquid crystal layer, a second substrate, and a second linearly polarizing plate, the liquid crystal panel having a reflectance of higher than 0.5% and 1.3% or lower in irradiating the liquid crystal panel with light from an antireflection layer side, and the liquid crystal display device satisfying $136.17X^{0.3891} \leq Y \leq 477.54X^{0.3086}$ with $X \geq 80$, where X (unit: lx) is defined as the environmental illuminance detected by the illuminance sensor, and Y (unit: nit) is defined as the luminance of the backlight, adjusted by the display controller.

(3) Yet another embodiment of the present invention is directed to a liquid crystal display device (hereinafter, also referred to as "a third liquid crystal display device according to the present invention") including: a liquid crystal panel; a backlight; an illuminance sensor that detects an environmental illuminance in a surrounding environment of the liquid crystal panel; and a display controller that adjusts a luminance of the backlight, based on the environmental illuminance detected by the illuminance sensor, the liquid crystal panel including, in order toward the backlight, an antireflection layer, a first linearly polarizing plate, a first λ/4 retardation layer, a first substrate, a second λ/4 retardation layer, a liquid crystal layer, a second substrate, and a second linearly polarizing plate, the liquid crystal panel having a reflectance of higher than 1.3% and 1.8% or lower in irradiating the liquid crystal panel with light from an antireflection layer side, and the liquid crystal display device satisfying $172.05X^{0.3979} \leq Y \leq 640.09X^{0.3122}$ with $X \geq 90$, where X (unit: lx) is defined as the environmental, illuminance detected by the illuminance sensor, and Y (unit: nit) is defined as the luminance of the backlight, adjusted by the display controller.

(4) One embodiment of the present invention, another embodiment of the present invention, and yet another embodiment of the present invention have a configuration according to any one of the above (1) to (3). In addition, the liquid crystal panel is a liquid crystal panel in a horizontal electric field mode.

The present invention can provide a liquid crystal display device which is capable of achieving low power consumption while ensuring visibility in a bright place.

DETAILED DESCRIPTION OF THE INVENTION

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

In the present specification, the phrase "X to Y" means "X or more and Y or less".

Embodiment 1

Figure 1:
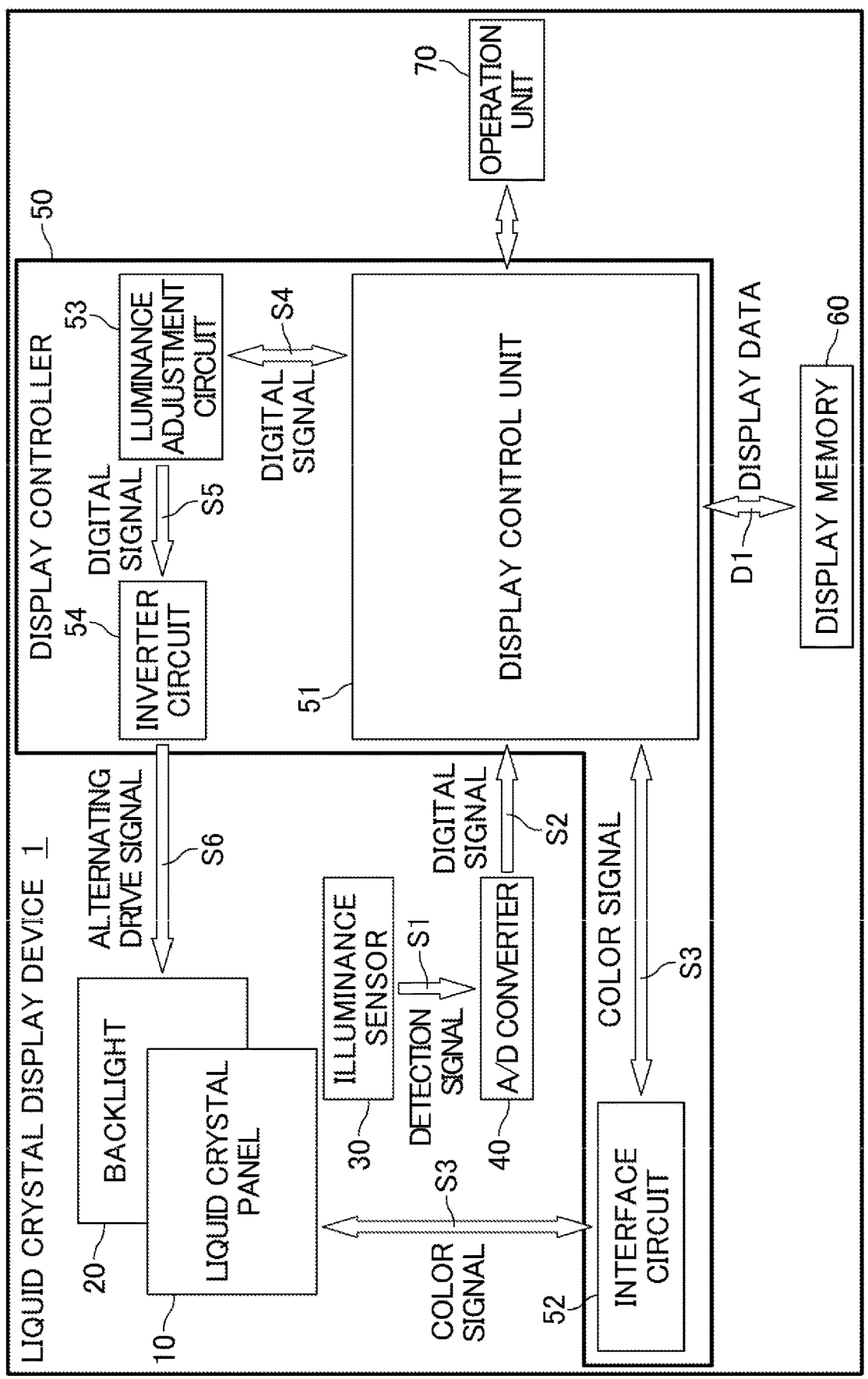
FIG. 1 is a block diagram illustrating a configuration of a liquid crystal display device according to Embodiment 1.

A liquid crystal display device according to Embodiment 1 corresponds to the above-described "first liquid crystal display device according to the present invention". FIG. 1 is a block diagram illustrating the configuration of the liquid crystal display device according to Embodiment 1. As shown in FIG. 1, the liquid crystal display device 1 includes a liquid crystal panel 10, a backlight 20, an illuminance sensor 30, an A/D converter 40, a display controller 50, a display memory 60, and an operation unit 70.

Figure 2:
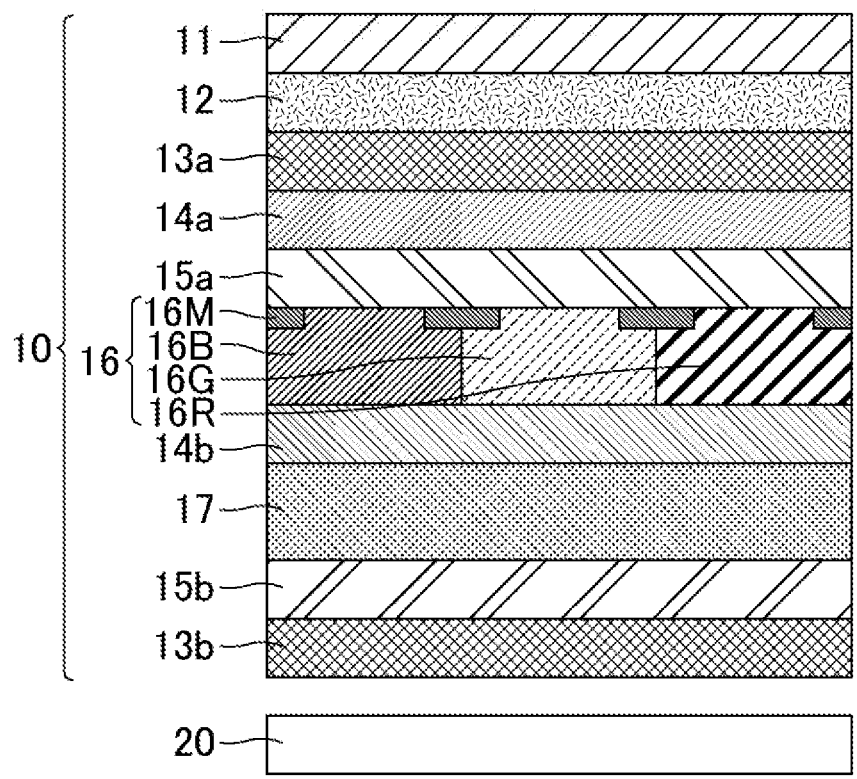
FIG. 2 is a schematic cross-sectional view illustrating a liquid crystal panel and a backlight in FIG. 1.

FIG. 2 is a schematic cross-sectional view illustrating the liquid crystal panel and the backlight in FIG. 1. As shown in FIG. 2, the liquid crystal panel 10 and the backlight 20 are disposed in order from the observation surface side toward the back side. In this specification, the "observation surface side" means a side closer to the screen of the liquid crystal panel, and refers to, for example, the side close to the liquid crystal panel 10 in FIG. 2. In addition, the "back side" means a side farther from the screen of the liquid crystal panel, and refers to, for example, the side close to the backlight 20 in FIG. 2.

<Liquid Crystal Panel>

The liquid crystal panel 10 includes, in order from the observation surface side to the back side (in order toward the backlight 20), an antireflection layer 11, an optically clear adhesive sheet 12, a first linearly polarizing plate 13a, a first λ/4 retardation layer 14a, a first substrate 15a, a color filter/black matrix 16, a second λ/4 retardation layer 14b, a liquid crystal layer 17, a second substrate 15b, and a second linearly polarizing plate 13b. The liquid crystal panel 10 may be a liquid crystal panel in a horizontal electric field mode such as an FFS mode or an IPS mode.

(Antireflection Layer)

Examples of the antireflection layer 11 include an antireflection layer composed of an organic film, and an antireflection layer composed of an inorganic film.

Examples of the antireflection layer composed of an organic film include a laminate of a low refractive index resin film and a high refractive index resin film, and these multiple resin films may be laminated alternately. As the numbers of low refractive index resin films and high refractive index resin films laminated are increased, the reflectance is decreased, and the antireflection performance is increased. Examples of the material for the low refractive index resin film Include fluorine resins such as "OPSTAR (registered trademark)" manufactured by ARAKAWA CHEMICAL INDUSTRIES, LTD. Examples of the material for the high refractive index resin film include a high refractive index coating solution manufactured by Sumitomo Osaka Cement Co., Ltd.

Examples of the antireflection layer composed of an inorganic film include multiple low refractive index films made of silicon dioxide ($SiO_2$) and high refractive index films made of niobium pentoxide ($Nb_2O_5$) laminated alternately.

The antireflection layer 11 may be, besides the foregoing, an antireflection layer that has, at the surface thereof, an irregular structure provided with multiple projections (protrusions) at a pitch equal to or less than a wavelength (780 nm) of visible light, i.e., a moth-eye structure. In this case, the moth-eye structure has only to be provided at the surface of the antireflection layer 11 on the observation surface side.

The antireflection layer 11 may be composed of a single layer, or multiple layers.

The antireflection layer 11 may be stacked for use on the surface of a transparent substrate such as a glass substrate (cover glass). In this case, the transparent substrate side has only to be attached to the first linearly polarizing plate 13a with the optically clear adhesive sheet 12 interposed therebetween.

(Optically Clear Adhesive Sheet)

The optically clear adhesive (OCA) sheet 12 is a transparent adhesive sheet which is commonly used for bonding optical members. Conventionally known sheets can be used as the optically clear adhesive sheet 12.

(First Linearly Polarizing Plate)

Examples of the first linearly polarizing plate 13a include a polyvinyl alcohol film stretched and aligned after dying the film with an anisotropic material such as an iodine complex (or dye) and adsorbing the material on the film (absorptive polarizing plate).

(First λ/4 Retardation Layer)

The first λ/4 retardation layer 14a is a retardation layer that provides an in-plane retardation of ¼ wavelength (λ/4) with respect to incident light with a wavelength λ, preferably a retardation layer that provides an in-plane retardation of 100 to 176 nm.

In this specification, the in-plane retardation Re of the retardation layer is expressed by Re=(ns−nf)d. In this regard, in a case where the main refractive index of the retardation layer in the in-plane direction is denoted by nx and ny, ns represents nx or ny, which is larger, whereas nf represents nx or ny, which is smaller, and d represents the thickness of the retardation layer. In the retardation layer, the in-plane slow axis refers to an axis in a direction corresponding to ns, and the in-plane fast axis refers to an axis in a direction corresponding to nf. In a case where the material of the retardation layer is a liquid crystal material, the in-plane retardation Re of the retardation layer is expressed by Re=Δnd, where the refractive index anisotropy of the liquid crystal material is denoted by Δn.

Examples of the material for the first λ/4 retardation layer 14a include a photopolymerizable material such as a photopolymerizable liquid crystal material. Examples of the structure of the photopolymerizable liquid crystal material include a structure having a photopolymerizable group such as an acrylate group or a methacrylate group at a terminal of the liquid crystal molecule skeleton. The photopolymerizable liquid crystal material, which is cured by heating and exposure, functions as the first λ/4 retardation layer 14a.

In a case where the first λ/4 retardation layer 14a is made of a photopolymerizable liquid crystal material, the first λ/4 retardation layer 14a laminated on a base substrate such as a polyethylene terephthalate film may be bonded to the surface of the first substrate 15a on the observation surface side (the side opposite to the liquid, crystal layer 17) with an adhesive or the like interposed therebetween. Further, an alignment film for the first λ/4 retardation layer 14a may be disposed between the base substrate and the first λ/4 retardation layer 14a. Thus, the cured product of the photopolymerizable liquid crystal material can be aligned by the alignment film to function effectively as the first λ/4 retardation layer 14a. Examples of the material for the alignment film include organic materials such as polyimide, and photoisomerization-type photo-alignment materials. The surface of the alignment film may be subjected to alignment treatment such as photo-alignment treatment or rubbing treatment.

As the first λ/4 retardation layer 14a, it is possible to use a stretched polymer film instead of the foregoing. Examples of the material for the polymer film include a cycloolefin polymer, polycarbonate, polysulfone, polyethersulfone, polyethylene terephthalate, polyethylene, polyvinyl alcohol, norbornene, triacetyl cellulose, and diacetyl cellulose.

The in-plane slow axis of the first λ/4 retardation layer 14a and the transmission axis of the first linearly polarizing plate 13a preferably make an angle of 45°. Thus, the laminate of the first λ/4 retardation layer 14a and the first linearly polarizing plate 13a functions as a circularly polarizing plate. In this case, since the internal reflection of the liquid crystal panel 10 is suppressed by the antireflection effect of the circularly polarizing plate, visibility in a bright place is enhanced significantly.

In this specification, the fact that two axes make an angle of 45° means that the angle made by the both axes is 42° to 48°, preferably 44° to 46°, more preferably 44.5° to 45.5°, particularly preferably 45°.

(First Substrate)

Examples of the first substrate 15a include a transparent substrate such as a glass substrate and a plastic substrate.

(Color Filter/Black Matrix)

The color filter/black matrix 16 is configured to have a red color filter 16R, a green color filter 16G, and a blue color filter 16B arranged in a plane, and have each color filter partitioned by a black matrix 16M. The color filter/black matrix 16 may be covered with an overcoat layer (transparent resin) that functions as a planarization layer.

Examples of the materials for the color filters 16R, 16G, and 16B include pigment-dispersed color resists. The color combination of the color filters is not limited to the combination of red, green, and blue, and may be a combination of red, green, blue, and yellow, for example.

Examples of the material for the black matrix 16M include pigment-dispersed color resists, and among the resists, black resists are preferred which have a light-shielding ratio of 99.9% or more (OD value of 3.0 or more).

The structure of the color filter/black matrix 16 disposed on the surface of the first substrate 15a is also referred to as a color filter substrate.

(Second λ/4 Retardation Layer)

The second λ/4 retardation, layer 14b is a retardation layer that provides an in-plane retardation of ¼ wavelength (λ/4) with respect to incident; light with a wavelength λ, and preferably a retardation layer that provides an in-plane retardation of 100 to 176 nm.

Examples of the material for the second λ/4 retardation layer 14b include, as in the case of the material for the first λ/4 retardation layer 14a, a photopolymerizable material such as a photopolymerizable liquid crystal material. The second λ/4 retardation layer 14b made of a photopolymerizable liquid crystal material also functions as a planarization layer for the color filter/black matrix 16, thus making the distance between the second λ/4 retardation layer 14b and the second substrate 15b (the thickness of the liquid crystal layer 17: cell gap) more likely to be uniform.

The in-plane slow axis of the first λ/4 retardation layer 14a is preferably orthogonal to the in-plane slow axis of the second λ/4 retardation layer 14b. Thus, the first λ/4 retardation layer 14a and the second λ/4 retardation layer 14b cancel the in-plane retardation with each other, with respect to incident light from the back aide of the liquid crystal panel 10 (emitted light from the backlight 20), thus optically achieving a condition substantially without the both retardation layers. For example, in a case where the liquid crystal panel 10 is a liquid crystal panel in a horizontal electric field mode, a configuration that is optically equivalent to a conventional liquid crystal panel in a horizontal electric field mode is achieved with respect to incident light from the back side of the liquid crystal panel 10. Accordingly, display in a horizontal electric field mode with a circularly polarizing plate can be achieved. In this regard, the first λ/4 retardation layer 14a and the second λ/4 retardation layer 14b are preferably made of the same material. Thus, the first λ/4 retardation layer 14a and the second λ/4 retardation layer 14b can cancel the in-plane retardation with each other, also including the wavelength dispersion.

In this specification, the fact that the two axes are orthogonal means that the angle made by the both axes is 87° to 93°, preferably 89° to 91°, more preferably 89.5° to 90.5°, particularly preferably 90° (completely orthogonal).

Between the first substrate 15a and the second λ/4 retardation layer 14b, specifically, between the color filter/black matrix 16 and the second λ/4 retardation layer 14b, an alignment film for the second λ/4 retardation layer 14b may be disposed. Thus, in a case where the second λ/4 retardation layer 14b is made of a photopolymerizable liquid crystal material, the cured product of the photopolymerizable liquid crystal material can be aligned by the alignment film to function effectively as the second λ/4 retardation layer 14b. Examples of the material for the alignment film include organic materials such as polyimide, and photoisomerization-type photo-alignment materials. The surface of the alignment film may be subjected to alignment treatment such as photo-alignment treatment or rubbing treatment.

Between the second λ/4 retardation layer 14b and the liquid crystal layer 17, an alignment film for the liquid crystal layer 17 may be disposed, and in a case where the liquid crystal panel 10 is a liquid crystal panel in a horizontal electric field mode, a horizontal alignment film for the liquid crystal layer 17 may be disposed. The horizontal alignment film has a function of aligning liquid crystal molecules in the liquid crystal layer 17 in parallel with the surface. In this specification, the fact that "the liquid crystal molecules are aligned in parallel with the surface of the horizontal alignment film (horizontally aligned)" means that the pre-tilt angles of the liquid crystal molecules are 0° to 5° with to respect to the surface of the horizontal alignment film. In addition, the pre-tilt angle of the liquid crystal molecule means an angle at which the major axis of the liquid crystal molecule is inclined with respect to the surface of the horizontal alignment film without any voltage applied to the liquid crystal layer. Examples of the material for the horizontal alignment film include organic materials such as polyimide, and photoisomerization-type photo-alignment materials. The surface of the horizontal alignment film may be subjected to alignment treatment such as photo-alignment treatment or rubbing treatment.

A photospacer may be disposed on the surface of the second λ/4 retardation layer 14b close to the back side (close to the liquid crystal layer 17). The photospacer makes the distance between the second λ/4 retardation layer 14b and the second substrate 15b (the thickness of the liquid crystal layer 17: cell gap) more likely to be maintained. In this case, as long as the photospacer is disposed so as to be superposed on the back side of the black matrix 16M, the photospacer is not visible in the case of the liquid crystal panel 10 in a plan view from the observation surface side.

The second λ/4 retardation layer 14b may be disposed between the color filter/black matrix 16 and the liquid crystal layer 17 as shown in FIG. 2, but may be disposed between the first substrate 15a and the color filter/black matrix 16.

(Liquid Crystal Layer)

The liquid crystal material contained in the liquid crystal layer 17 may be a positive liquid crystal material with positive anisotropy of dielectric constant or a negative liquid crystal material with negative anisotropy of dielectric constant. In a case where the liquid crystal panel 10 is a liquid crystal panel in a horizontal electric field mode, the liquid crystal molecules in the liquid crystal layer 17 are horizontally aligned in a predetermined direction without any voltage applied to the liquid crystal layer 17. On the other hand, the liquid crystal molecules in the liquid crystal layer 17 rotate in the in-plane direction depending on the horizontal electric field generated in the liquid crystal layer 17, with a voltage applied to the liquid crystal layer 17.

(Second Substrate)

Examples of the second substrate 15b include a transparent substrate such as a glass substrate and a plastic substrate.

For example, members such as a gate line, a source line, a thin-film transistor element, and an electrode may be disposed on the surface of the of the second substrate 15b close to the observation surface side (close to the liquid crystal layer 17). Such a structure is also referred to as a thin-film transistor array substrate.

In a case where the liquid crystal panel 10 is a liquid crystal panel in an FFS mode, on the surface of the second substrate 15b close to the observation surface side (close to the liquid crystal layer 17), a common electrode (planar electrode), an insulating film, and a pixel electrodes (slit electrodes) are disposed in order toward the observation surface side (liquid crystal layer 17). In this case, a voltage is applied between the common electrode and the pixel electrodes, thereby generating a horizontal electric field (fringe field) in the liquid crystal layer 17, and then controlling the alignment of the liquid crystal molecules in the liquid crystal layer 17. Examples of the materials for the common electrode and the pixel electrodes include transparent materials (inorganic materials) such as an indium tin oxide (ITO) and an indium zinc oxide (IZO). It is possible to use, as the material for the insulating film, for example, any of an organic insulating materials (for example, polyimide) and inorganic insulating materials (for example, nitride).

In a case where the liquid crystal panel 10 is a liquid crystal panel in an IPS mode, a voltage is applied between a pair of comb-teeth electrodes disposed on the surface of the second substrate 15b close to the observation surface side (close to liquid crystal layer 17), thereby generating a horizontal electric field in the liquid crystal layer 17, and then controlling the alignment of the liquid crystal molecules in the liquid crystal layer 17.

Between the second substrate 15b and the liquid crystal layer 17, an alignment film for the liquid crystal layer 17 may be disposed, and in a case where the liquid crystal panel 10 is a liquid crystal panel in a horizontal electric field mode, a horizontal alignment film for the liquid crystal layer 17 may be disposed.

(Second Linearly Polarizing Plate)

Examples of the second linearly polarizing plate 13b include a polyvinyl alcohol film stretched and aligned after dying the film with an anisotropic material such as an iodine complex (or dye) and adsorbing the material on the film (absorptive polarizing plate).

The transmission axis of the first linearly polarizing plate 13a is preferably orthogonal to the transmission axis of the second linearly polarizing plate 13b, Thus, the first linearly polarizing plate 13a and the second linearly polarizing plate 13b are arranged in crossed Nicols, and then, in a case where the liquid crystal panel 10 is a liquid crystal panel in a horizontal electric field mode, black display without any voltage applied to the liquid crystal layer 17, and gray scale display (halftone display, white display, etc.) with a voltage applied to the liquid crystal layer 17 are each effectively achieved.

The liquid crystal panel 10 has a reflectance of higher than 0% and 0.5% or lower in irradiating the liquid crystal panel 10 with light from an antireflection layer 11 side. In this specification, the term "reflectance" means a luminous reflectance (Y value) measured by an integrating sphere method with the use of diffused light as a light source. It is possible to measure such a luminous reflectance, for example, with the use of "CM-2600d" manufactured by KONICA MINOLTA, INC., in an SCI (Specular Component Included) mode as a measurement mode, with a measurement wavelength range of 380 to 780 nm, at a light-receiving angle of 8° (±5°). The reflectance of the liquid crystal panel 10 is classified into a surface reflectance and an internal reflectance.

<Backlight>

Examples of the backlight 20 include edge light-type and direct-type backlights. Examples of the light source for the backlight 20 include a light emitting diode (LED: Light Emitting Diode) and a cold cathode fluorescent lamp (CCFL: Cold Cathode Fluorescent Lamp).

<Illuminance Sensor>

The illuminance sensor 30 detects the environmental illuminance in the surrounding environment of the liquid crystal panel 10, and generates a detection signal S1 that indicates the environmental illuminance. The illuminance sensor 30 then outputs the detection signal S1 to the A/D converter 40. In this specification, the surrounding environment of the liquid crystal panel means, not the back side (backlight side) of the liquid crystal panel, but the observation surface side (screen side). Accordingly, the illuminance sensor 30 is disposed near the liquid crystal panel 10 and at a position where the emitted light from the backlight 20 is not incident. The illuminance sensor 30 may have a spectral sensitivity characteristic that provides a maximum output with respect to light with a predetermined wavelength.

<A/D Converter>

The A/D converter 40 converts the detection signal S1 output from the illuminance sensor 30, into a digital signal S2. Then, the A/D converter 40 outputs the digital signal S2 to the display controller 50.

<Display Controller>

The display controller 50 includes a display control unit 51, an interface circuit 52, a luminance adjustment circuit 53, and an inverter circuit 54.

(Display Control Unit)

The display control unit 51 has a CPU (Central Processing Unit), and an input/output port circuit, and a memory built therein.

The display control unit 51 reads out display data D1 from the display memory 60, and converts the display data D1 into a color signal S3. Then, the display control unit 51 outputs the color signal S3 to the interface circuit 52.

On the other hand, the display control unit 51 converts the digital signal S2 output from the A/D converter 40, into a digital signal S4. Specifically, first, the display control unit 51 determines the luminance range of the backlight 20, with the use of a function associated in advance with the reflectance of the liquid crystal panel 10, with information contained in the digital signal S2, that is, the environmental illuminance detected by the illuminance sensor 30 as a variable. In Embodiment 1, the luminance range of the backlight 20 is represented by $39.002X^{0.4225} \leq Y \leq 220.42X^{0.2918}$ with $X \geq 70$, where X (unit: lx) is defined as the environmental illuminance detected by the illuminance sensor 30, and Y (unit: nit) is defined as the luminance of the backlight 20.

Next, the observer (user) operates the operation unit 70, thereby setting a desired luminance for the backlight 20 from the luminance range determined above. Unlike such a procedure, a procedure may be adopted, where the observer sets the luminance of the backlight 20 in advance with the operation unit 70, and the display control unit 51 determines whether the luminance of the backlight 20 falls within the luminance range determined above.

Then, the display control unit 51 generates the digital signal S4 with a frequency corresponding to the set luminance of the backlight 20. Thereafter, the display control unit 51 outputs the digital signal S4 to the luminance adjustment circuit 53.

(Interface Circuit)

The interface circuit 52 outputs the color signal S3 output from the display control unit 51, to a drive circuit (for example, a gate line drive circuit, a source line drive circuit) of the liquid crystal panel 10. Thus, an image is displayed on the screen of the liquid crystal panel 10.

(Luminance Adjustment Circuit)

The luminance adjustment circuit 53 converts the digital signal S4 output from the display control unit 51, into a digital signal S5 that indicates the luminance of the backlight 20. Then, the luminance adjustment circuit 53 outputs the digital signal S5 to the inverter circuit 54.

(Inverter Circuit)

The inverter circuit 54 generates an alternating drive signal 36 corresponding to the frequency of the digital signal S5 output from the luminance adjustment circuit 53. Then, the inverter circuit 54 outputs the alternating drive signal S6 to the backlight 20. Thus, the backlight 20 emits light with a predetermined luminance in response to the current value or voltage value of the input alternating drive signal S6.

In the way described above, the display controller 50 adjusts the luminance of the backlight 20, based on the environmental illuminance detected by the illuminance sensor 30.

<Display Memory>

The display memory 60 stores display data D1.

<Operation Unit>

The operation unit 70 is intended for the observer of the liquid crystal display device 1 to perform the operation of setting the luminance of the backlight 20 and the like.

Embodiment 2

A liquid crystal display device according to Embodiment 2 corresponds to the above-described "second liquid crystal display device according to the present invention". The liquid crystal display device according to Embodiment 2 is the same as the liquid crystal display device according to Embodiment 1, except for the following features, and the description of overlapped points will be omitted.

The liquid crystal panel 10 has a reflectance of higher than 0.5% and 1.3% or lower in irradiating the liquid crystal panel 10 with light from an antireflection layer 11 side.

The luminance range of the backlight 20, determined by the display control unit 51 in the display controller 50, is represented by $136.17X^{0.3891} \leq Y \leq 477.54X^{0.3086}$ with $X \geq 80$, where X (unit: lx) is defined as the environmental illuminance detected by the illuminance sensor 30, and Y (unit: nit) is defined as the luminance of the backlight 20.

Embodiment 3

A liquid crystal display device according to Embodiment 3 corresponds to the above-described "third liquid crystal display device according to the present invention". The liquid crystal display device according to Embodiment 3 is the same as the liquid crystal display device according to Embodiment 1, except for the following features, and the description of overlapped points will be omitted.

The liquid crystal panel 10 has a reflectance of higher than 1.3% and 1.8% or lower in irradiating the liquid crystal panel 10 with light from an antireflection layer 11 side.

The luminance range of the backlight 20, determined by the display control unit 51 in the display controller 50, is represented by $172.05X^{0.3979} \leq Y \leq 640.09X^{0.3122}$ with $X \geq 90$, where X (unit: lx) is defined as the environmental illuminance detected by the illuminance sensor 30, and Y (unit: nit) is defined as the luminance of the backlight 20.

EXAMPLES AND COMPARATIVE EXAMPLE

Hereinafter, the present invention is described in more detail based on examples and a comparative example. The examples, however, are not intended to limit the scope of the present invention.

In the examples and the comparative example, the in-plane retardations of the first λ/4 retardation layer and second λ/4 retardation layer show values for light with a wavelength of 550 nm. In this regard, light with a wavelength 550 nm is light with a wavelength at the highest human visibility is achieved. In addition, the orientation of the transmission axis of the first linearly polarizing plate, the orientation of the in-plane slow axis of the first λ/4 retardation layer, the orientation of the in-plane slow axis of the second λ/4 retardation layer, the alignment orientation of the liquid crystal molecules (the orientation of the slow axis), and the orientation of the transmission axis of the second linearly polarizing plate are defined by angles, with the counterclockwise angles regarded as positive (+) with respect to the longitudinal direction of the liquid crystal panel as a reference (0°).

Example 1

As a liquid crystal display device according to Example 1, the liquid crystal display device according to Embodiment 1 was manufactured. As constituent members for a liquid crystal panel in the liquid crystal display device according to Example 1, the following members were used.

(Antireflection Layer)

As the antireflection layer 11, an antireflection layer with a five-layer structure of $SiO_2/Nb_2O_5/SiO_2/Nb_2O_5/SiO_2$ was used, and laminated on the surface of a glass substrate (cover glass, thickness: 0.25 mm).

(Optically Clear Adhesive Sheet)

As the optically clear adhesive sheet 12, "Optically Clear Adhesive 8146-1" manufactured by 3M was used.

(First Linearly Polarizing Plate)

As the first linearly polarizing plate 13a, a polyvinyl alcohol film stretched and aligned after dying the film with an iodine complex (or dye) and adsorbing the material on the film (absorptive polarizing plate) was used, and the orientation of the transmission axis was 0°.

(First λ/4 Retardation Layer)

As the first λ/4 retardation layer 14a, the layer prepared by the following method was used. First, a photoisomerization-type photo-alignment material was applied onto the surface of a polyethylene terephthalate film to form a photo-alignment material film. Thereafter, the photo-alignment material film was baked at 80° C. for 1 minute to form an alignment film for the first λ/4 retardation layer 14a. Next, a photopolymerizable liquid crystal material (a liquid crystal material having an acrylate group at the terminal of the liquid crystal molecule skeleton, refractive index anisotropy Δn: 0.14) was dissolved in propylene glycol monomethyl ether acetate (organic solvent) to prepare a coating solution. Then, this coating solution was applied onto the surface of the alignment film for the first λ/4 retardation layer 14a to form a coating film. Thereafter, the coating film was baked at 90° C. for 80 seconds, and irradiated with ultraviolet rays (irradiation amount at a wavelength of 365 nm: 500 mJ/cm$^2$), thereby forming the first λ/4 retardation layer 14a. As a result, a laminate was formed where the polyethylene terephthalate film, the alignment film for the first λ/4 retardation layer 14a, and the first λ/4 retardation layer 14a were sequentially laminated. Then, this laminate was bonded to the surface of the first substrate 15a closer to the observation surface side, with an adhesive interposed therebetween from the side with the first λ/4 retardation layer 14a, and then the polyethylene terephthalate film was peeled off. The specifications of the first λ/4 retardation layer 14a were as follows:

Thickness: 1.0 μm
In-plane retardation: 140 nm
In-plane slow axis orientation: −45°

(First Substrate)

As the first substrate 15a, a glass substrate was used, which was 0.7 mm in thickness.

(Color Filter/Black Matrix)

As the color filter 16R, a filter composed of a pigment-dispersed red resist (red color filter, thickness: 2.4 μm) was used. As the color filter 16G, a filter composed of a pigment-dispersed green resist (green color filter, thickness: 2.5 μm) was used. As the color filter 16B, a filter composed of a pigment-dispersed blue resist (blue color filter, thickness: 2.6 μm) was used. As the black matrix 16M, a matrix composed of a black resist with a light-shielding ratio of 99.9% (thickness: 1.0 μm) was used.

(Second λ/4 Retardation Layer)

As the second λ/4 retardation layer 14b, the layer prepared by the following method was used. First, a photoisomerization-type photo-alignment material was applied onto the surface of the color filter/black matrix 16 to form a photo-alignment material film. Thereafter, the photo-alignment material film was baked at 80° C. for 1 minute to form an alignment film for the second λ/4 retardation layer 14b. Next, a photopolymerizable liquid crystal material (a liquid crystal material having an acrylate group at the terminal of the liquid crystal molecule skeleton, refractive index anisotropy Δn: 0.14) was dissolved in propylene glycol monomethyl ether acetate (organic solvent) to prepare a coating solution. Then, this coating solution was applied onto the surface of the alignment film for the second λ/4 retardation layer 14b to form a coating film. Thereafter, the coating film was baked at 90° C. for 80 seconds, and irradiated with ultraviolet rays (irradiation amount at a wavelength of 365 nm: 500 mJ/cm$^2$), thereby forming the second λ/4 retardation layer 14b. The specifications of the second λ/4 retardation layer 14b were as follows:

Thickness: 1.0 μm
In-plane retardation: 140 nm
In-plane slow axis orientation: 45°

In addition, an alignment film (horizontal alignment film) for the liquid crystal layer 17 was formed on the surface of the second λ/4 retardation layer 14b. Specifically, first, a photoisomerization-type photo-alignment material was applied onto the surface of the second λ/4 retardation layer 14b to form a photo-alignment material film. Then, this photo-alignment material film was subjected to pre-baking at 90° C. for 80 seconds, irradiated with polarized ultraviolet rays (irradiation amount at a wavelength of 365 nm: 5 J/cm$^2$), and then subjected to post-baking at 220° C. for 35 minutes. As a result, an alignment film for the liquid crystal layer 17 was formed.

(Liquid Crystal Layer)

As the liquid crystal material contained in the liquid crystal layer 17, a negative liquid crystal material (anisotropy of dielectric constant Δε: −3.6) was used. The alignment orientation of liquid crystal molecules (the orientation of the slow axis) was 90° without any voltage applied.

(Second Substrate)

As the second substrate 15b, a glass substrate was used, which was 0.7 mm in thickness. Further, members such as thin-film transistors element, a common electrode, an insulating film, and pixel electrodes are formed on the surface of the second substrate 15b to provide a thin-film transistor array substrate in an FFS mode. Electrodes made of an indium zinc oxide were used as the common electrode and the pixel electrodes. As the insulating film, a film made of a silicon nitride was used.

Furthermore, an alignment film (horizontal alignment film) for the liquid crystal layer 17 was formed on the surface of the thin-film transistor array substrate. Specifically, first, a photoisomerization-type photo-alignment material was applied onto the surface of the thin-film transistor array substrate to form a photo-alignment material film. Then, this photo-alignment material film was subjected to pre-baking at 90° C. for 80 seconds, irradiated with polarized ultraviolet rays (irradiation amount at a wavelength of 365 nm: 5 J/cm$^2$), and then subjected to post-baking at 220° C. for 35 minutes. As a result, an alignment film for the liquid crystal layer 17 was formed.

(Second Linearly Polarizing Plate)

As the second linearly polarizing plate 13b, a polyvinyl alcohol film stretched and aligned after dying the film with an iodine complex (or dye) and adsorbing the material on the film (absorptive polarizing plate) was used, and the orientation of the transmission axis was 90°.

Example 2

As a liquid crystal display device according to Example 2, the liquid crystal display device according to Embodiment 2 was manufactured. The constituent members of the liquid crystal panel in the liquid crystal display device according to Example 2 were the same as the constituent members of the liquid crystal panel in the liquid crystal display device according to Example 1, except that the antireflection layer 11 has a three-layer structure of $SiO_2/Nb_2O_5/SiO_2$.

Example 3

As a liquid crystal display device according to Example 3, the liquid crystal display device according to Embodiment 3 was manufactured. The constituent members of the liquid crystal panel in the liquid crystal display device according to Example 3 were the same as the constituent members of the liquid crystal panel in the liquid crystal display device according to Example 1, except that the antireflection layer 11 has a single-layer structure of a magnesium fluoride layer.

Comparative Example 1

Figure 3:
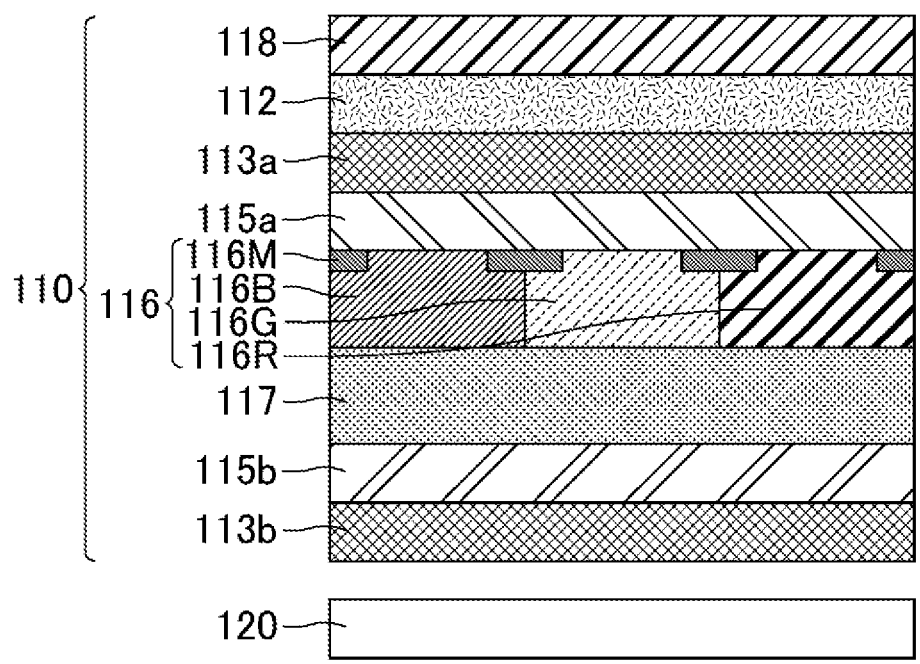
FIG. 3 is a schematic cross-sectional view illustrating a liquid crystal panel and a backlight in a liquid crystal display device according to Comparative Example 1.

FIG. 3 is a schematic cross-sectional view illustrating a liquid crystal panel and a backlight in a liquid crystal display device according to Comparative Example 1. As shown in FIG. 3, a liquid crystal panel 110 and a backlight 120 are disposed in order from the observation surface side to the back side.

The liquid crystal panel 110 includes, in order from the observation surface side to the back side (in order toward the backlight 120), cover glass 118, an optically clear adhesive sheet 112, a first linearly polarizing plate 113a, a first substrate 115a, a color filter/black matrix 116, a liquid crystal layer 117, a second substrate 115b, and a second linearly polarizing plate 113b. The color filter/black matrix 116 is configured to have a red color filter 116R, a green color filter 116G, and a blue color filter 116B arranged in a plane, and have each color filter partitioned by a black matrix 116M.

As constituent members for the liquid crystal panel 110, the following members were used.

(Cover Glass)

As the cover glass 118, a glass substrate was used, which was 0.25 mm in thickness.

(Optically Clear Adhesive Sheet)

As the optically clear adhesive sheet 112, "Optically Clear Adhesive 8146-1" manufactured by 3M was used.

(First Linearly Polarizing Plate)

As the first linearly polarizing plate 113a, a polyvinyl alcohol film stretched and aligned after dying the film with an iodine complex (or dye) and adsorbing the material on the film (absorptive polarizing plate) was used, and the orientation of the transmission axis was 0°.

(First Substrate)

As the first substrate 115a, a glass substrate was used, which was 0.7 mm in thickness.

(Color Filter/Black Matrix)

As the color filter 116R, a filter composed of a pigment-dispersed red resist (red color filter, thickness: 2.4 µm) was used. As the color filter 116G, a filter composed of a pigment-dispersed green resist (green color filter, thickness: 2.5 µm) was used. As the color filter 116B, a filter composed of a pigment-dispersed blue resist (blue color filter, thickness: 2.6 µm) was used. As the black matrix 116M, a matrix composed of a black resist with a light-shielding ratio of 99.9% (thickness: 1.0 µm) was used.

In addition, an alignment film (horizontal alignment film) for the liquid crystal layer 117 was formed on the surface of the color filter/black matrix 116. Specifically, first, a photoisomerization-type photo-alignment material was applied onto the surface of the color filter/black matrix 116 to form a photo-alignment material film. Then, this photo-alignment material film was subjected to pre-baking at 90° C. for 80 seconds, irradiated with polarized ultraviolet rays (irradiation amount at a wavelength of 365 nm: 5 J/cm$^2$), and then subjected to post-baking at 220° C. for 35 minutes. As a result, an alignment film for the liquid crystal layer 117 was formed.

(Liquid Crystal Layer)

As the liquid crystal material contained in the liquid crystal layer 117, a negative liquid crystal material (anisotropy of dielectric constant $\Delta\epsilon$: −3.6) was used. The alignment orientation of liquid crystal molecules (the orientation of the slow axis) was 90° without any voltage applied.

(Second Substrate)

As the second substrate 115b, a glass substrate was used, which was 0.7 mm in thickness. Further, members such as thin-film transistors element, a common electrode, an insulating film, and pixel electrodes are formed on the surface of the second substrate 115b to provide a thin-film transistor array substrate in an FFS mode. Electrodes made of an indium zinc oxide were used as the common electrode and the pixel electrodes. As the insulating film, a film made of a silicon nitride was used.

Furthermore, an alignment film (horizontal alignment film) for the liquid crystal layer 117 was formed on the surface of the thin-film transistor array substrate. Specifically, first, a photoisomerization-type photo-alignment material was applied onto the surface of the thin-film transistor array substrate to form a photo-alignment material film. Then, this photo-alignment material film was subjected to pre-baking at 90° C. for 80 seconds, irradiated with polarized ultraviolet rays (irradiation amount at a wavelength of 365 nm: 5 J/cm$^2$), and then subjected to post-baking at 220° C. for 35 minutes. As a result, an alignment film for the liquid crystal layer 117 was formed.

(Second Linearly Polarizing Plate)

As the second linearly polarizing plate 113b, a polyvinyl alcohol film stretched and aligned after dying the film with an iodine complex (or dye) and adsorbing the material on the film (absorptive polarizing plate) was used, and the orientation of the transmission axis was 90°.

[Evaluation 1]

Multiple types of liquid crystal display devices were prepared which were different from each other in contrast ratio ACR in a bright place (environmental illuminance: higher than 0.1 lx), defined by the following formula (F).

$$ACR=[Lw+La(Rs+Ri)]/[Lb+La(Rs+Ri)]=[Lw+La(Rs+Ri)]/[Lw/DCR+La(Rs+Ri)] \quad (F)$$

Lw: Luminance in the case of full white display (255 gray scales) on the liquid crystal display device Lb: Luminance in the case of full black display (0 gray scales) on the liquid crystal display device La: Environmental luminance (=environmental illuminance/($2\pi$))

Rs: Surface reflectance of the liquid crystal panel

Ri: Internal reflectance of the liquid crystal panel

DCR: Contrast of the liquid crystal display device in a dark place (environmental illuminance: 0.1 lx)

It is to be noted that according to the formula (F) mentioned above, it is determined that reducing the reflectance of the liquid crystal panel (surface reflectance Rs+internal reflectance Ri) contributes to an improvement in contrast ratio ACR in a bright place, that is, an improvement in visibility in a bright place.

Next, these liquid crystal display devices were visually evaluated by 30 observers on the following five-point scale, for the visibility under each environment with the environmental illuminance of 200 lx, 2000 lx, or 20000 lx.

Score 5: visible very well
Score 4: visible well
Score 3: visible
Score 2: slightly less visible
Score 1: not visible In this regard, a case where the score was 3 or higher was determined to have visibility ensured in a bright place.

As a result of the evaluation, the contrast ratio ACR in the bright place is presented as shown in Table 1, for the case where the minimum value among the scores from all of the observers is 3 (hereinafter, also referred to as "a specification that achieves the score 3"), and the case where the minimum value among the scores from all of the observers is 4 (hereinafter, also referred to as "a specification that achieves the score 4"). It is to be noted that in a case where there are multiple values for contrast ratio ACR corresponding to the respective specifications, the minimum value among the values was selected as a representative value.

TABLE 1

| Environmental illuminance (lx) | ACR in specification that achieves score 3 | ACR in specification that achieves score 4 |
| --- | --- | --- |
| 200 | 100 | 200 |
| 2000 | 40 | 70 |
| 20000 | 10 | 15 |

[Evaluation 2]

For the liquid crystal display device according to Comparative Example 1, the surface reflectance Rs of the liquid crystal panel, the internal reflectance Ri of the liquid crystal panel, and the contrast ratio DCR of the liquid crystal display device in the dark place were measured. The measurement results are shown in Table 2.

The surface reflectance Rs of the liquid crystal panel was measured as follows. First, the outermost member (the cover glass in the case of Comparative Example 1) of the liquid crystal panel on the observation surface side was bonded to a black acrylic plate, with "Optically Clear Adhesive 8146-1" manufactured by 3M, interposed between the member and the plate. Next, with the use of "CM-2600d" (integrating sphere method) manufactured by KONICA MINOLTA, INC., the member (the cover glass in the case of Comparative Example 1) bonded to the black acrylic plate was irradiated with diffused light to measure the luminous reflectance (Y value) in an SCI mode as a measurement mode, with a measurement wavelength range of 380 to 780 nm, at a light-receiving angle of 8° (±5°). This luminous reflectance was then regarded as the surface reflectance Rs.

The internal reflectance Ri of the liquid crystal panel was calculated by subtracting the surface reflectance Rs from the reflectance of the entire liquid crystal panel. In this regard, for the reflectance of the entire liquid crystal panel, with the use of "CM-2600d" (integrating sphere method) manufactured by KONICA MINOLTA, INC., diffused light irradiation was performed from the observation surface side (the cover glass side in the case of Comparative Example 1) to measure the luminous reflectance (Y value) in an SCI mode as a measurement mode, with a measurement wavelength range of 380 to 780 nm, at a light-receiving angle of 8° (±5°).

The contrast ratio DCR of the liquid crystal display device in the dark place was calculated as follows. First, under an environment with an illuminance of 0.1 lx, the luminance in the case of the full black display (0 gray scales) and the luminance in the case of the full white display (255 gray scales) were measured with the use of "SR-UL1R" manufactured by TOPCON TECHNOHOUSE CORPORATION. Then, the contrast ratio DCR=the luminance in the case of full white display (255 gray scales)/the luminance in the case of full black display (0 gray scales) was calculated.

TABLE 2

| | |
|---|---|
| Surface reflectance Rs (%) | 4.0 |
| Internal reflectance Ri (%) | 1.5 |
| Contrast ratio DCR in dark place | 1000 |

Figure 4:
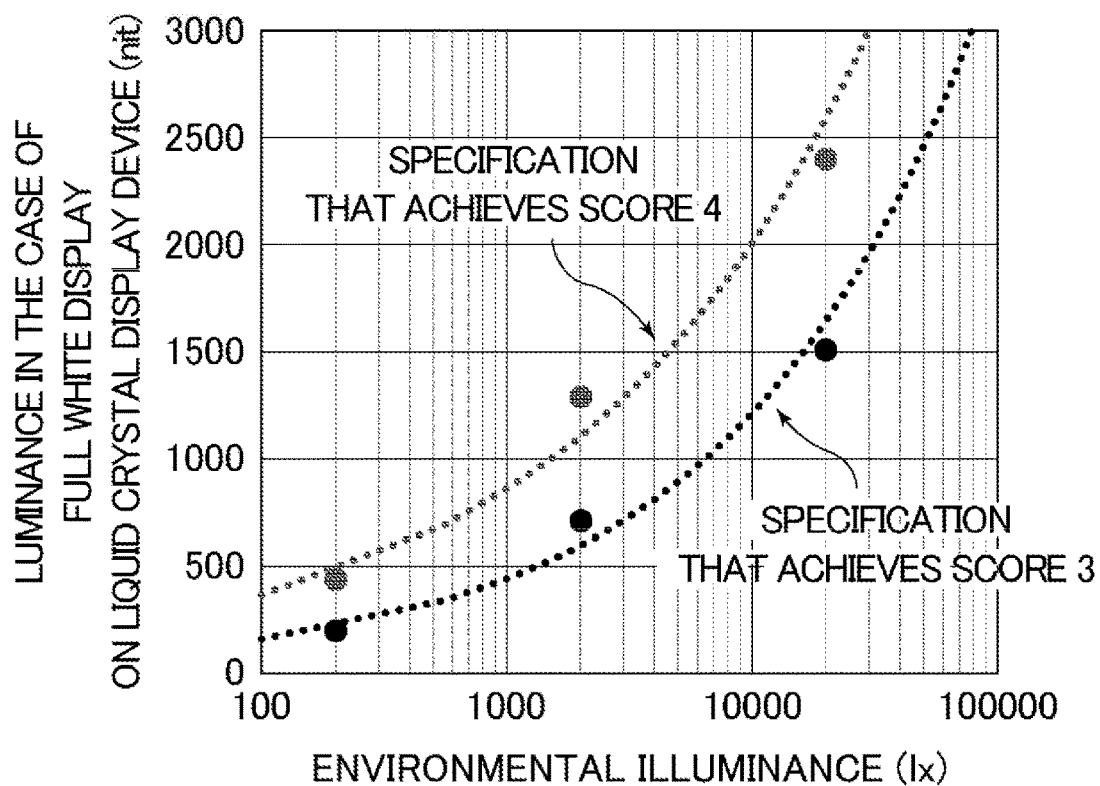
FIG. 4 is a graph showing, for the liquid crystal display device according to Comparative Example 1, the relationship between the luminance in the case of full, white display on the liquid crystal display device for ensuring visibility in a bright place and the environmental illuminance.

Next, with the use of the above-mentioned formula (F), the evaluation results shown in Table 1, and the measurement results shown in Table 2, the luminance Lw in the case of full white display on the liquid crystal display device for "the specification that achieves the score 3" and "the specification that achieves the score 4" was calculated as the visibility under each environment with the environmental illuminance of 200 lx, 2000 lx, or 20000 lx. FIG. 4 is a graph showing, for the liquid crystal display device according to Comparative Example 1, the relationship between the luminance in the case of full white display on the liquid crystal display device for ensuring visibility in a bright place and the environmental illuminance. The plotted points in FIG. 4 correspond to the calculation results. The curves indicated by the dotted lines in FIG. 4 are obtained by curve approximation of the calculation results for each specification. Specifically, the specification that achieves the score 3 and the specification that achieves the score 4 have respectively achieved $Lw=21.283X^{0.439}$ and $Lw=67.409X^{0.3684}$, where the environmental illuminance and the luminance in the case of full white display on the liquid crystal display device are defined respectively as X (unit: lx) and Lw (unit: nit).

Figure 5:
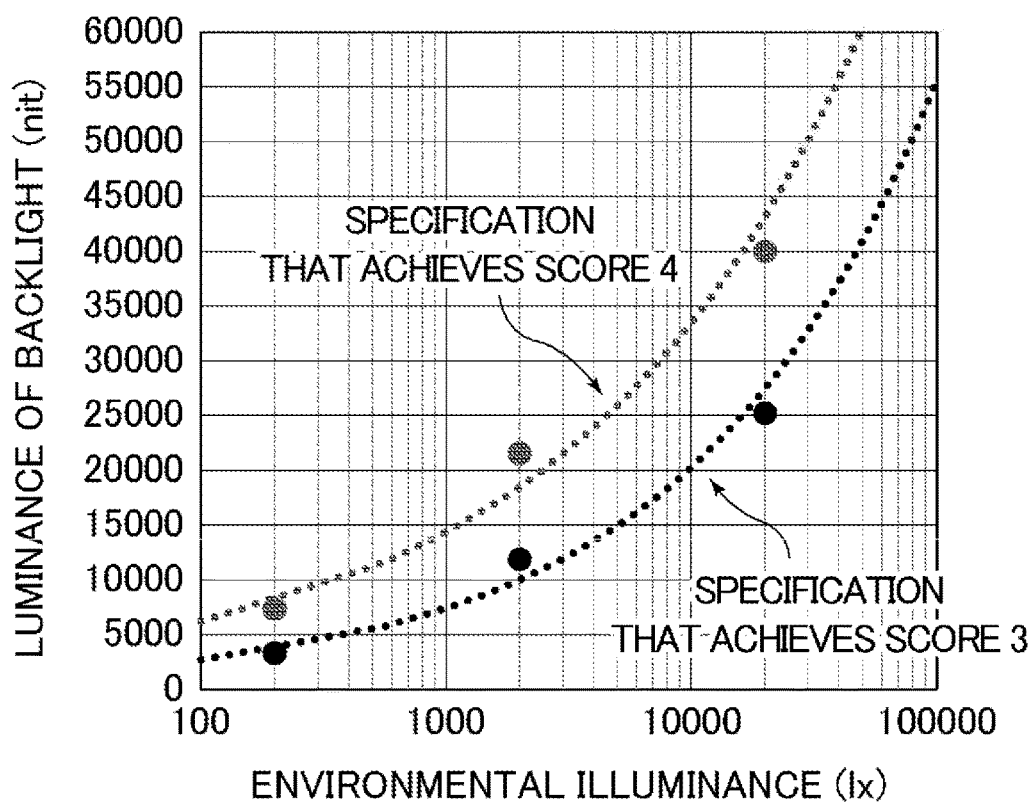
FIG. 5 is a graph showing, for the liquid crystal display device according to Comparative Example 1, the relationship between the luminance of the backlight for ensuring visibility in a bright place and the environmental illuminance.

Next, since the light use efficiency (the use efficiency of the emitted light from the backlight) was 6% in the case of full white display on the liquid crystal display device according to Comparative Example 1, "the luminance in the case of full white display on the liquid crystal display device" plotted on the vertical axis in FIG. 4 was divided by the light use efficiency (6%) to convert the luminance to a "backlight luminance". FIG. 5 is a graph showing, for the liquid crystal display device according to Comparative Example 1, the relationship between the luminance of the backlight for ensuring visibility in a bright place and the environmental illuminance. As shown in FIG. 5, the specification that achieves the score 3 and the specification that achieves the score 4 have respectively achieved $Y=354.71X^{0.439}$ and $Y=1123.5X^{0.3684}$, where the environmental illuminance and the luminance of the backlight are defined respectively as X (unit: lx) and Y (unit: nit). According to FIG. 5, for example, in a case where the environmental illuminance X is 10000 lx (in the case of corresponding to outdoors in the morning under cloudiness), the luminance Y of the backlight is about 20000 nits in a specification that ensures the minimum visibility in the bright place, that is, in the specification that achieves the score 3. On the other hand, at present, the backlights employed in portable liquid crystal display devices such as smartphones and tablet terminals have, also due to problems with heat dissipation and size, luminance on the order of 15000 nits at the maximum. Accordingly, the liquid crystal display device according to Comparative Example 1 was difficult to ensure visibility in the bright place. Moreover, even if a backlight with a luminance of 20000 nits could be employed, it was not possible to achieve low power consumption.

[Evaluation 3]

For the liquid crystal display device according to Example 1, the surface reflectance Rs of the liquid crystal panel (the outermost member on the observation surface side: antireflection layer), the internal reflectance Ri of the liquid crystal panel, and the contrast ratio DCR of the liquid crystal display device in the dark place were measured in the same way as in Evaluation 2 as described above. The measurement results are shown in Table 3.

TABLE 3

| | |
|---|---|
| Surface reflectance Rs (%) | 0.2 |
| Internal reflectance Ri (%) | 0.3 |
| Contrast ratio DCR in dark place | 500 |

Figure 6:
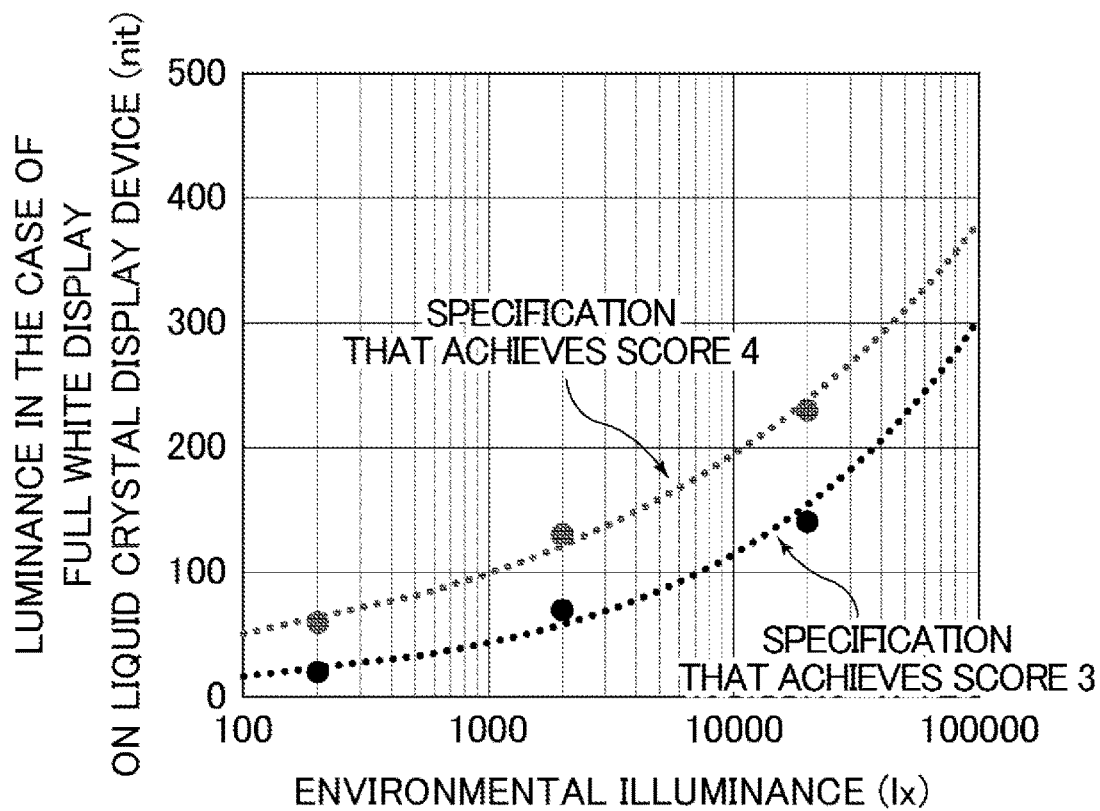
FIG. 6 is a graph showing, for a liquid crystal display device according to Example 1, the relationship between the luminance in the case of full white display on the liquid crystal display device for ensuring visibility in a bright place and the environmental illuminance.

Next, with the use of the above-mentioned formula (F), the evaluation results shown in Table 1, and the measurement results shown in Table 3, the luminance Lw in the case of full white display on the liquid crystal display device for "the specification that achieves the score 3" and "the specification that achieves the score 4" was calculated as the visibility under each environment with the environmental illuminance of 200 lx, 2000 lx, or 20000 lx. FIG. 6 is a graph showing, for the liquid crystal display device according to Example 1, the relationship between the luminance in the case of full white display on the liquid crystal display device for ensuring visibility in a bright place and the environmental illuminance. The plotted points in FIG. 6 correspond to the calculation results. The curves indicated by the dotted lines in FIG. 6 are obtained by curve approximation of the calculation results for each specification. Specifically, the specification that achieves the score 3 and the specification that achieves the score 4 have respectively achieved $Lw=2.3401X^{0.4225}$ and $Lw=13.225X^{0.2918}$, where the environmental illuminance and the luminance in the case of full white display on the liquid crystal display device are defined respectively as X (unit: lx) and Lw (unit: nit).

Figure 7:
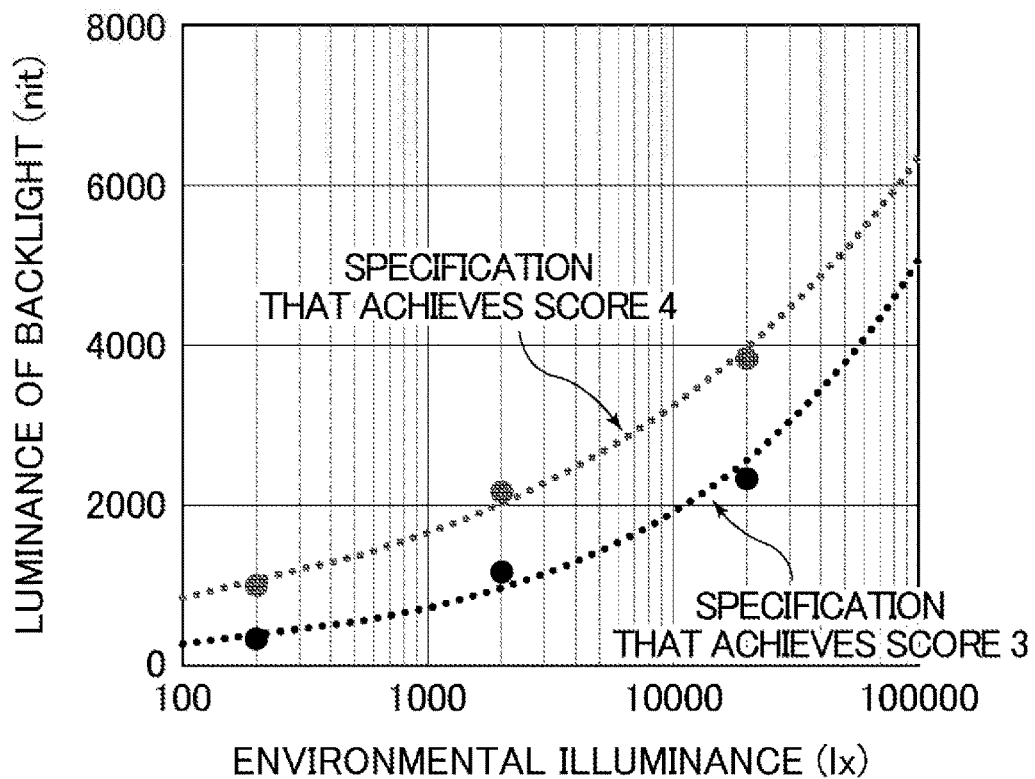
FIG. 7 is a graph showing, for the liquid crystal display device according to Example 1, the relationship between the luminance of the backlight for ensuring visibility in a bright place and the environmental illuminance.

Next, since the light use efficiency (the use efficiency of the emitted light from the backlight) was 6% in the case of full white display on the liquid crystal display device according to Example 1, "the luminance in the case of full white display on the liquid crystal display device" plotted on the vertical axis in FIG. 6 was divided by the light use efficiency (6%) to convert the luminance to a "backlight luminance". FIG. 7 is a graph showing, for the liquid crystal display device according to Example 1, the relationship between the luminance of the backlight, for ensuring visibility in a bright place and the environmental illuminance. As shown in FIG. 7, the specification that achieves the score 3 and the specification that achieves the score 4 have respectively achieved $Y=39.002X^{0.4225}$ and $Y=220.42X^{0.2918}$, where the environmental illuminance and the luminance of the backlight are defined respectively as X (unit: lx) and Y (unit: nit). According to FIG. 7, for example, in a case where the environmental illuminance X is 10000 lx (in the case of corresponding to outdoors in the morning under cloudiness), the luminance Y of the backlight is about 1910 nits in the specification that achieves the score 3, and about 3240 nits in the specification that achieves the score 4. In this regard, with respect to the luminance Y of the backlight in the specification that achieves the score 3, Example 1 (about 1910 nits) is about 1/10 of Comparative Example 1 (about 20000 nits).

From the foregoing, it has been determined that in the case of the liquid crystal display device according to Example 1, in order to ensure visibility in the bright place, it is only necessary to achieve the specification that achieves the score 3 at a minimum, specifically, adjust the luminance Y of the backlight so as to satisfy $Y \geq 39.002X^{0.4225}$ depending on the environmental illuminance X. On the other hand, it has been determined that in the case of the liquid crystal display device according to Example 1, in order to achieve low power consumption, it is only necessary to make the luminance of the backlight equal to or less than that in the specification that achieves the score 4, specifically, adjust the luminance Y of the backlight so as to satisfy $Y \leq 220.42X^{0.2918}$ depending on the environmental illuminance X. In summary, it has been determined that in the case of the liquid crystal display device according to Example 1, in order to achieve low power consumption while ensuring visibility in the bright place, it is only necessary to adjust the luminance Y of the backlight so as to satisfy the luminance range (R1): $39.002X^{0.4225} \leq Y \leq 220.42X^{0.2918}$ depending on the environmental illuminance X.

In actuality, with the liquid crystal display device according to Example 1 placed under an environment with an environmental illuminance of 10000 lx, the environmental illuminance (illuminance in the surrounding environment: 10000 lx) was detected with the illuminance sensor, and the luminance of the backlight, adjusted to 1910 nit (the specification that achieves the score 3), was visually confirmed with the display controller on the basis of the luminance range (R1). Then, it was possible to visually confirm the display image without any stress. Further, it has been confirmed that the visibility is further enhanced by adjusting the luminance of the backlight to 3240 nit (the specification that achieves the score 4) with the display controller on the basis of the luminance range (R1).

In the case of the liquid crystal display device according to Example 1, the reflectance of the liquid crystal panel was 0.5% (=0.2% (surface reflectance Rs)+0.3% (internal reflectance Ri)), but in a case where the reflectance of the liquid crystal panel was higher than 0% and 0.5% or lower, the same result as in Example 1 was achieved.

[Evaluation 4]

For the liquid crystal display device according to Example 2, the surface reflectance Rs of the liquid crystal panel (the outermost member on the observation surface side: antireflection layer), the internal reflectance Ri of the liquid crystal panel, and the contrast ratio DCR of the liquid crystal display device in the dark place were measured in the same way as in Evaluation 2 as described above. The measurement results are shown in Table 4.

TABLE 4

| | |
|---|---|
| Surface reflectance Rs (%) | 1.0 |
| Internal reflectance Ri (%) | 0.3 |
| Contrast ratio DCR in dark place | 500 |

Figure 8:
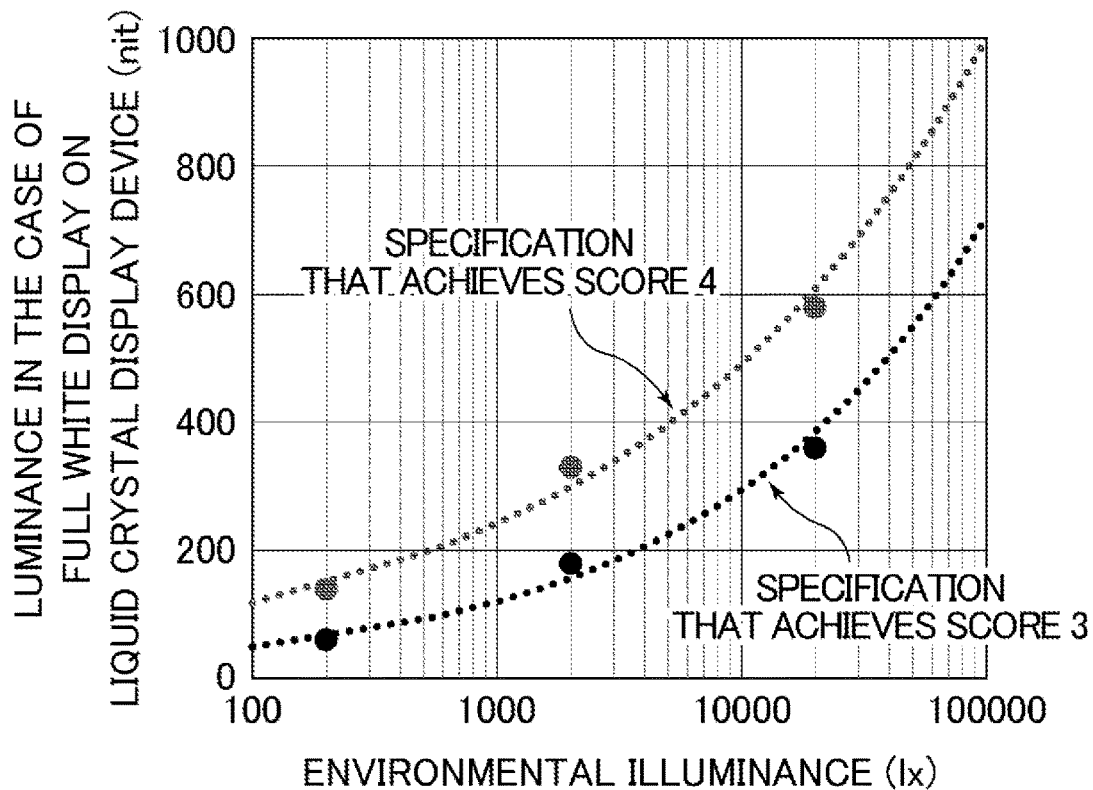
FIG. 8 is a graph showing, for a liquid crystal display device according to Example 2, the relationship between the luminance in the case of full white display on the liquid crystal display device for ensuring visibility in a bright place and the environmental illuminance.

Next, with the use of the above-mentioned formula (F), the evaluation results shown in Table 1, and the measurement results shown in Table 4, the luminance Lw in the case of full white display on the liquid crystal display device for "the specification that achieves the score 3" and "the specification that achieves the score 4" was calculated as the visibility under each environment with the environmental illuminance of 200 lx, 2000 lx, or 20000 lx. FIG. 8 is a graph showing, for the liquid crystal display device according to Example 2, the relationship between the luminance in the case of full white display on the liquid crystal display device for ensuring visibility in a bright place and the environmental illuminance. The plotted points in FIG. 8 correspond to the calculation results. The curves indicated by the dotted lines in FIG. 8 are obtained by curve approximation of the calculation results for each specification. Specifically, the specification that achieves the score 3 and the specification that achieves the score 4 have respectively achieved $Lw=8.1701X^{0.3891}$ and $Lw=28.652X^{0.3086}$, where the environmental illuminance and the luminance in the case of full white display on the liquid crystal display device are defined respectively as X (unit: lx) and Lw (unit: nit).

Figure 9:
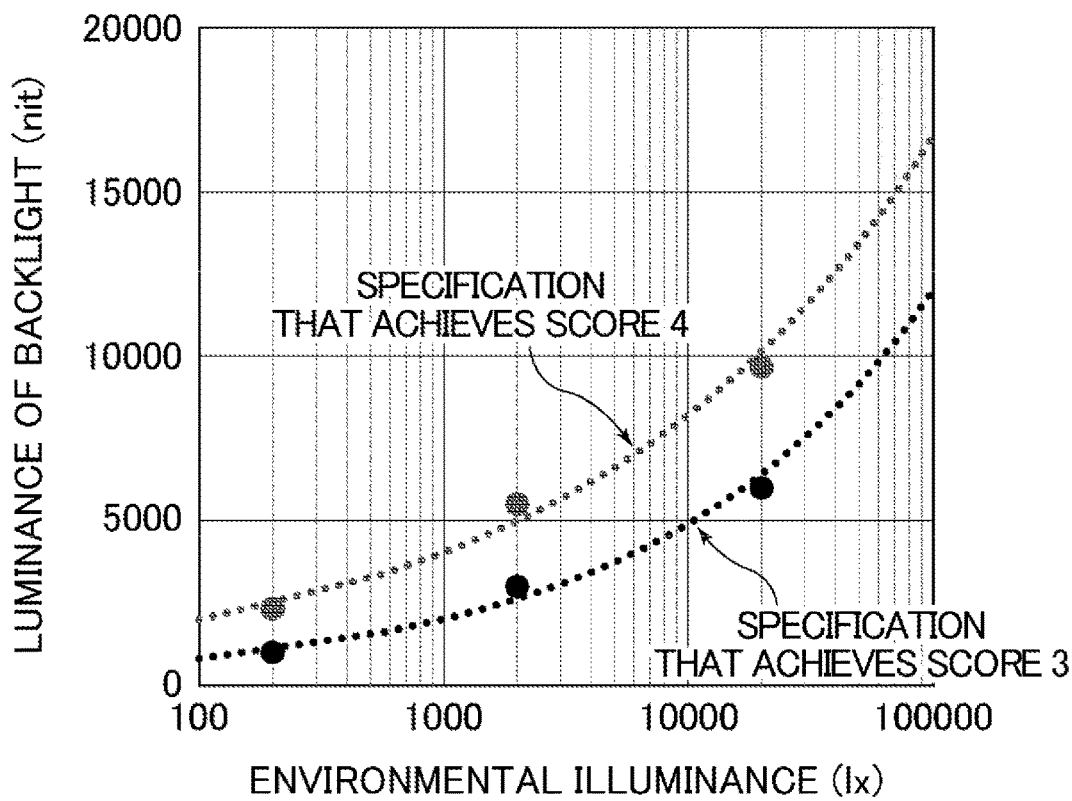
FIG. 9 is a graph showing, for the liquid crystal display device according to Example 2, the relationship between the luminance of the backlight for ensuring visibility in a bright place and the environmental illuminance.

Next, since the light use efficiency (the use efficiency of the emitted light from the backlight) was 6% in the case of full white display on the liquid crystal display device according to Example 2, "the luminance in the case of full white display on the liquid crystal display device" plotted on the vertical axis in FIG. 8 was divided by the light use efficiency (6%) to convert the luminance to a "backlight luminance". FIG. 9 is a graph showing, for the liquid crystal display device according to Example 2, the relationship between the luminance of the backlight for ensuring visibility in a bright place and the environmental illuminance. As shown in FIG. 9, the specification that achieves the score 3 and the specification that achieves the score 4 have respectively achieved $Y=136.17X^{0.3891}$ and $Y=477.54X^{0.3086}$, where the environmental illuminance and the luminance of the backlight are defined respectively as X (unit: lx) and Y (unit: nit). According to FIG. 9, for example, in a case where the environmental illuminance X is 10000 lx (in the case of corresponding to outdoors in the morning under cloudiness), the luminance Y of the backlight is about 4500 nits in the specification that achieves the score 3, and about 8190 nits in the specification that achieves the score 4. In this regard, with respect to the luminance Y of the backlight in the specification that achieves the score 3, Example 2 (about 4900 nits) is about 1/4 of Comparative Example 1 (about 20000 nits).

From the foregoing, it has been determined that in the case of the liquid crystal display device according to Example 2, in order to ensure visibility in the bright place, it is only necessary to achieve the specification that achieves the score 3 at a minimum, specifically, adjust the luminance Y of the backlight so as to satisfy $Y \geq 136.17X^{0.3891}$ depending on the environmental illuminance X. On the other hand, it has been determined that in the case of the liquid crystal display device according to Example 2, in order to achieve low power consumption, it is only necessary to make the luminance of the backlight equal to or less than that in the specification that achieves the score 4, specifically, adjust the luminance Y of the backlight so as to satisfy $Y \leq 477.54X^{0.3086}$ depending on the environmental illuminance X. In summary, it has been determined that in the case of the liquid crystal display device according to Example 2, in order to achieve low power consumption while ensuring visibility in the bright place, it is only necessary to adjust the luminance Y of the backlight so as to satisfy the luminance range (R2): $136.17X^{0.3891} \leq Y \leq 477.54X^{0.3086}$ depending on the environmental illuminance X.

In actuality, with the liquid crystal display device according to Example 2 placed under an environment with an environmental illuminance of 10000 lx, the environmental illuminance (illuminance in the surrounding environment: 10000 lx) was detected with the illuminance sensor, and the luminance of the backlight, adjusted to 4900 nit (the specification that achieves the score 3), was visually confirmed with the display controller on the basis of the luminance range (R2). Then, it was possible to visually confirm the display image without any stress. Further, it has been confirmed that the visibility is further enhanced by adjusting the luminance of the backlight to 8190 nit (the specification that achieves the score 4) with the display controller on the basis of the luminance range (R2).

In the case of the liquid crystal display device according to Example 2, the reflectance of the liquid crystal panel was 1.3% (=1.0% (surface reflectance Rs)+0.3% (internal reflectance Ri)), but in a case where the reflectance of the liquid crystal panel was higher than 0.5% and 1.3% or lower, the same result as in Example 2 was achieved.

[Evaluation 5]

For the liquid crystal display device according to Example 3, the surface reflectance Rs of the liquid crystal panel (the outermost member on the observation surface side: antireflection layer), the internal reflectance Ri of the liquid crystal panel, and the contrast ratio DCR of the liquid crystal display device in the dark place were measured in the same way as in Evaluation 2 as described above. The measurement results are shown in Table 5.

TABLE 5

| | |
|---|---|
| Surface reflectance Rs (%) | 15 |
| Internal reflectance Ri (%) | 0.3 |
| Contract ratio DCR in dark place | 500 |

Figure 10:
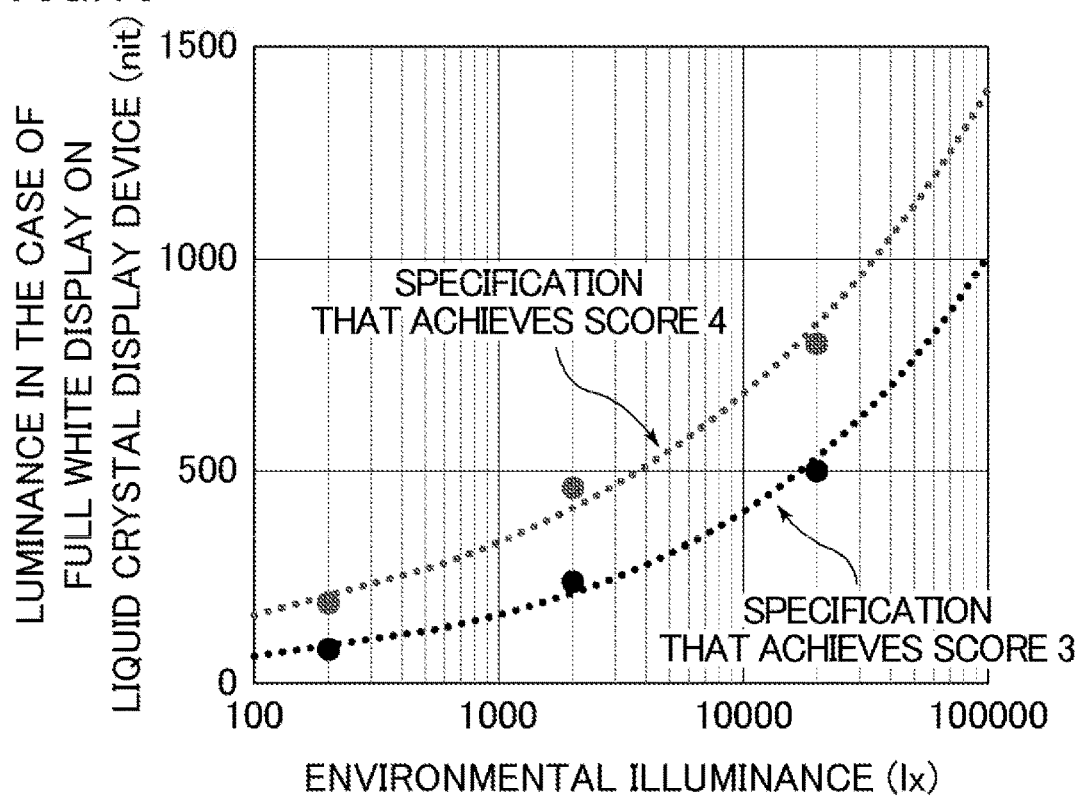
FIG. 10 is a graph showing, for a liquid crystal display device according to Example 3, the relationship between the luminance in the case of full white display on the liquid crystal display device for ensuring visibility in a bright place and the environmental illuminance.

Next, with the use of the above-mentioned formula (F), the evaluation results shown in Table 1, and the measurement results shown in Table 5, the luminance Lw in the case of full white display on the liquid crystal display device for "the specification that achieves the score 3" and "the specification that achieves the score 4" was calculated as the visibility under each environment with the environmental illuminance of 200 lx, 2000 lx, or 20000 lx. FIG. 10 is a graph showing, for the liquid crystal display device according to Example 3, the relationship between the luminance in the case of full white display on the liquid crystal display device for ensuring visibility in a bright place and the environmental illuminance. The plotted points in FIG. 10 correspond to the calculation results. The curves indicated by the dotted lines in FIG. 10 are obtained by curve approximation of the calculation results for each specification. Specifically, the specification that achieves the score 3 and the specification that achieves the score 4 have respectively achieved $Lw=10.323X^{0.3979}$ and $Lw=38.405X^{0.3122}$, where the environmental illuminance and the luminance in the case of full white display on the liquid crystal display device are defined respectively as X (unit: lx) and Lw (unit: nit).

Figure 11:
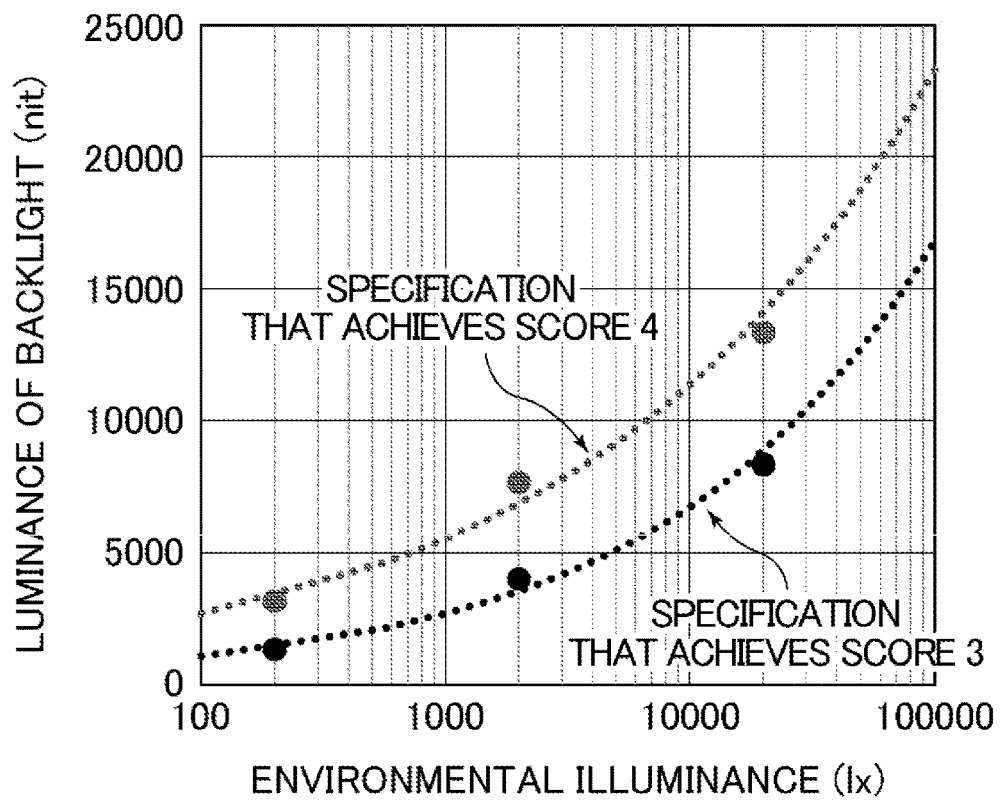
FIG. 11 is a graph showing, for the liquid crystal display device according to Example 3, the relationship between the luminance of the backlight for ensuring visibility in a bright place and the environmental illuminance.

Next, since the light use efficiency (the use efficiency of the emitted light from the backlight) was 6% in the case of full white display on the liquid crystal display device according to Example 3, "the luminance in the case of full white display on the liquid crystal display device" plotted on the vertical axis in FIG. 10 was divided by the light use efficiency (6%) to convert the luminance to a "backlight luminance". FIG. 11 is a graph showing, for the liquid crystal display device according to Example 3, the relationship between the luminance of the backlight for ensuring visibility in a bright place and the environmental illuminance. As shown in FIG. 11, the specification that achieves the score 3 and the specification that achieves the score 4 have respectively achieved $Y=172.05X^{0.3979}$ and $Y=640.09X^{0.3122}$, where the environmental illuminance and the luminance of the backlight are defined respectively as X (unit: lx) and Y (unit: nit). According to FIG. 11, for example, in a case where the environmental illuminance X is 10000 lx (in the case of corresponding to outdoors in the morning under cloudiness), the luminance Y of the backlight is about 6720 nits in the specification that achieves the score 3, and about 11350 nits in the specification that achieves the score 4. In this regard, with respect to the luminance Y of the backlight in the specification that achieves the score 3, Example 3 (about 6720 nits) is about ⅓ of Comparative Example 1 (about 20000 nits).

From the foregoing, it has been determined that in the case of the liquid crystal display device according to Example 3, in order to ensure visibility in the bright place, it is only necessary to achieve the specification that achieves the score 3 at a minimum, specifically, adjust the luminance Y of the backlight so as to satisfy $Y \geq 172.05X^{0.3979}$ depending on the environmental illuminance X, On the other hand, it has been determined that in the case of the liquid crystal display device according to Example 3, in order to achieve low power consumption, it is only necessary to make the luminance of the backlight equal to or less than that in the specification that achieves the score 4, specifically, adjust the luminance Y of the backlight so as to satisfy $Y \leq 640.09X^{0.3122}$ depending on the environmental illuminance X. In summary, it has been determined that in the case of the liquid crystal display device according to Example 3, in order to achieve low power consumption while ensuring visibility in the bright place, it is only necessary to adjust the luminance Y of the backlight so as to satisfy the luminance range (R3): $172.05X^{0.3979} \leq Y \leq 640.09X^{0.3122}$ depending on the environmental illuminance X.

In actuality, with the liquid crystal display device according to Example 3 placed under an environment with an environmental illuminance of 10000 lx, the environmental illuminance (illuminance in the surrounding environment: 10000 lx) was detected with the illuminance sensor, and the luminance of the backlight, adjusted to 6720 nit (the specification that achieves the score 3), was visually confirmed with the display controller on the basis of the luminance range (R3). Then, it was possible to visually confirm the display image without any stress. Further, it has been confirmed that the visibility is further enhanced by adjusting the luminance of the backlight to 11350 nit (the specification that achieves the score 4) with the display controller on the basis of the luminance range (R3).

In the case of the liquid crystal display device according to Example 3, the reflectance of the liquid crystal panel was 1.8% (=1.5% (surface reflectance Rs)+0.3% (internal reflectance Ri)), but in a case where the reflectance of the liquid crystal panel was higher than 1.3% and 1.8% or lower, the same result as in Example 3 was achieved.

[Evaluation 6]

In the liquid crystal display devices according to Examples 1 to 3, the range of the environmental illuminance for the achievement of a sufficient effect with respect to the liquid crystal display device according to Comparative Example 1 was examined from the viewpoint of visibility in a bright place. Specifically, for the liquid crystal display devices according to Comparative Example 1 and Examples 1 to 3, with the use of the above-mentioned formula (F) (set to Lw=500 nit) and the measurement results shown in Tables 2 to 5, the contrast ratio ACR in the bright place was calculated under various environmental illuminance conditions.

Figure 12:
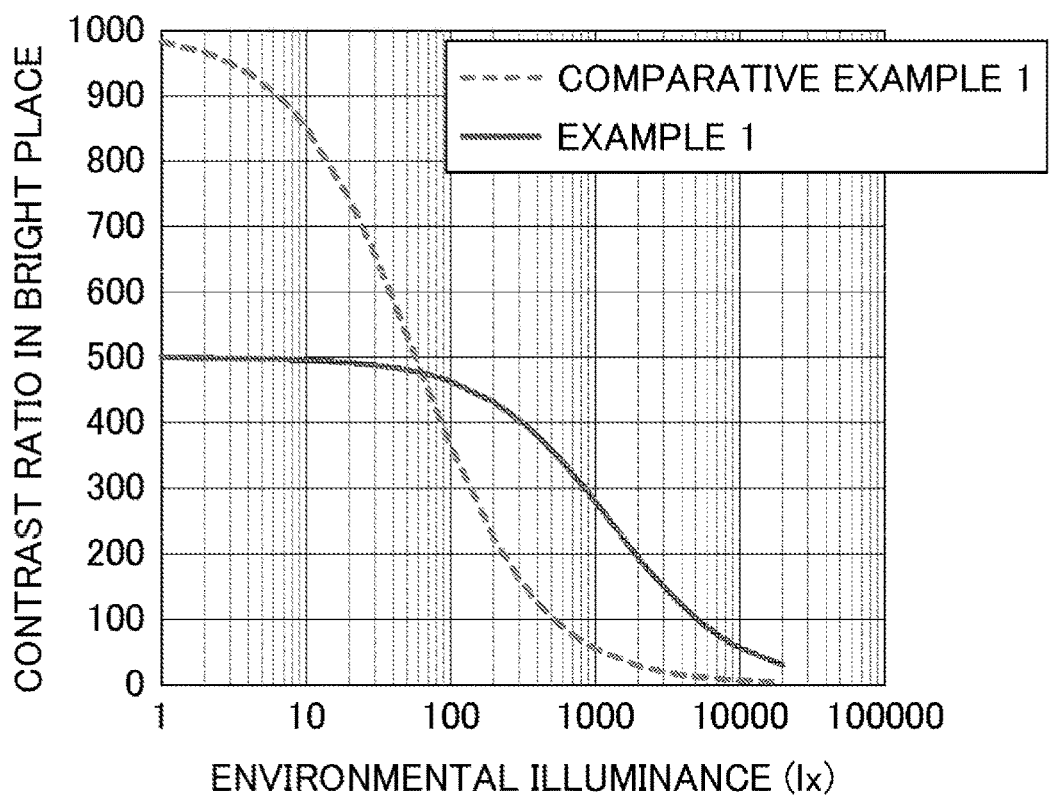
FIG. 12 is a graph showing, for the liquid crystal display devices according to Example 1 and Comparative Example 1, the relationship between the contrast ratio in the bright place and the environmental illuminance.

FIG. 12 is a graph showing, for the liquid crystal display devices according to Example 1 and Comparative Example 1, the relationship between the contrast ratio in the bright place and the environmental illuminance. As shown in FIG. 12, in a case where the environmental illuminance was 70 lx or more, the contrast ratio of the liquid crystal display device according to Example 1 in the bright place was higher than the contrast ratio of the liquid crystal display device according to Comparative Example 1 in the bright place.

Figure 13:
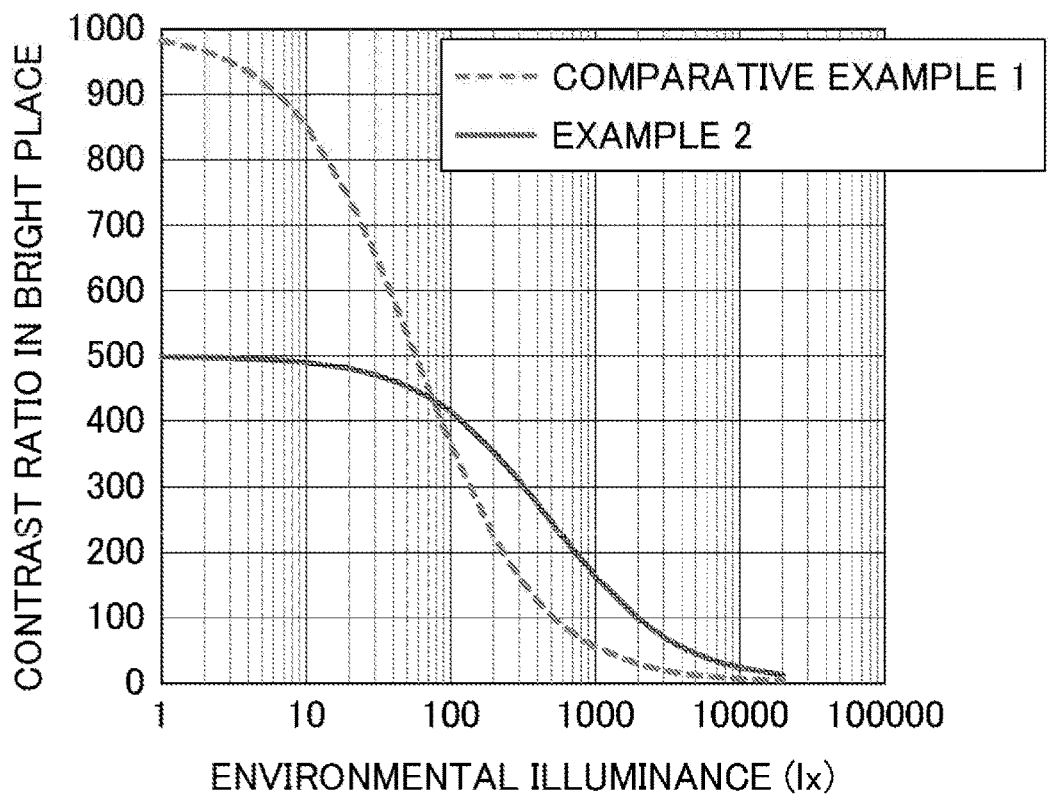
FIG. 13 is a graph showing, for the liquid crystal display devices according to Example 2 and Comparative Example 1, the relationship between the contrast ratio in the bright place and the environmental illuminance.

FIG. 13 is a graph showing, for the liquid crystal display devices according to Example 2 and Comparative Example 1, the relationship between the contrast ratio in the bright place and the environmental illuminance. As shown in FIG. 13, in a case where the environmental illuminance was 80 lx or more, the contrast ratio of the liquid crystal display device according to Example 2 in the bright place was higher than the contrast ratio of the liquid crystal display device according to Comparative Example 1 in the bright place.

Figure 14:
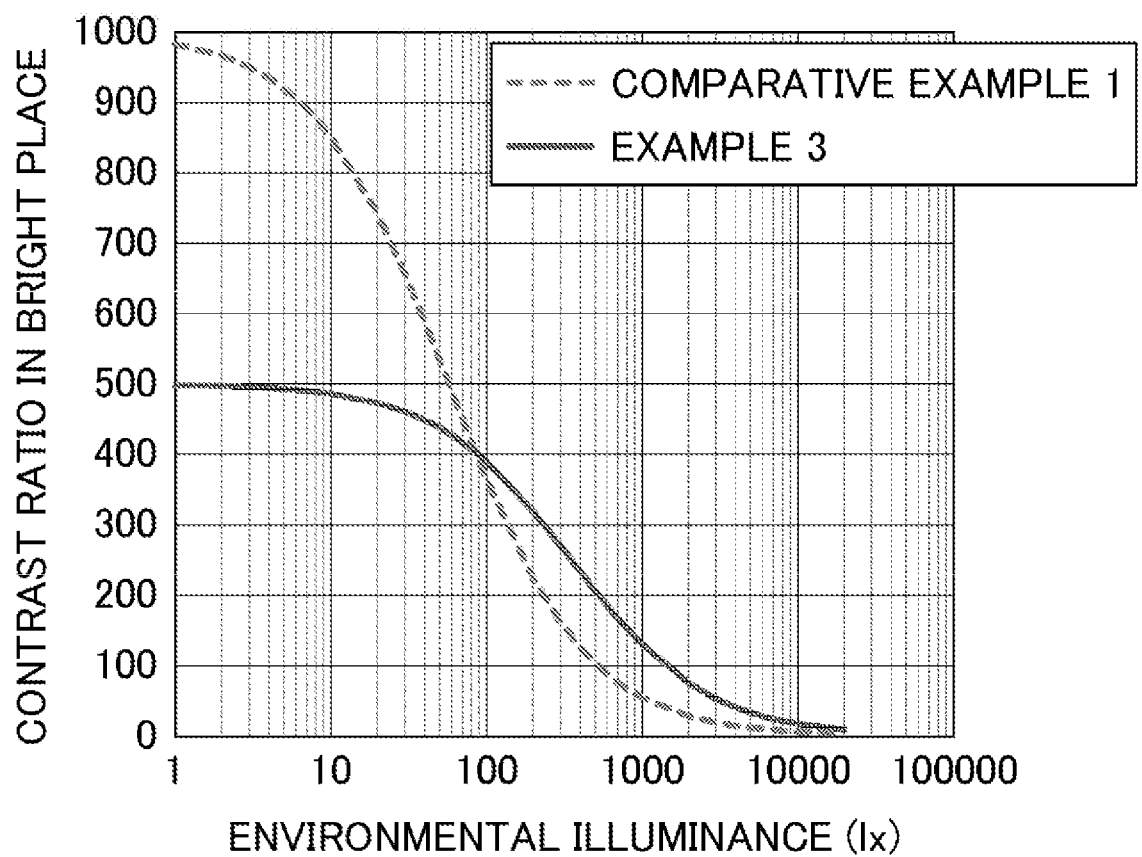
FIG. 14 is a graph showing, for the liquid crystal display devices according to Example 3 and Comparative Example 1, the relationship between the contrast ratio in the bright place and the environmental illuminance.

FIG. 14 is a graph showing, for the liquid crystal display devices according to Example 3 and Comparative Example 1, the relationship between the contrast ratio in the bright place and the environmental illuminance. As shown in FIG. 14, in a case where the environmental illuminance was 90 lx or more, the contrast ratio of the liquid crystal display device according to Example 3 in the bright place was higher than the contrast ratio of the liquid crystal display device according to Comparative Example 1 in the bright place.

From the summarization of the results of Evaluations 1 to 6, it has been determined that in the liquid crystal display devices according to Examples 1 to 3, the luminance of the backlight is optimally adjusted as in the following (A), (B), and (C), thereby making it possible to achieve low power consumption while ensuring visibility in a bright place, as compared with the liquid crystal display device according to Comparative Example 1 (conventional liquid crystal display device).

(A) The liquid crystal display device according to Example 1 satisfies $39.002X^{0.4225} \leq Y \leq 220.42X^{0.2918}$ with $X \geq 70$, where X (unit: lx) is defined as the environmental illuminance detected by the illuminance sensor, and Y (unit: nit) is defined as the luminance of the backlight, adjusted by the display controller. This applies in a case where the reflectance of the liquid crystal panel is higher than 0% and 0.5% or lower.

(B) The liquid crystal display device according to Example 2 satisfies $136.17X^{0.3891} \leq Y \leq 477.54X^{0.3086}$ with $X \geq 80$, where X (unit: lx) is defined as the environmental illuminance detected by the illuminance sensor, and Y (unit: nit) is defined as the luminance of the backlight, adjusted by the display controller. This applies in a case where the reflectance of the liquid crystal panel is higher than 0.5% and 1.3% or lower.

(C) The liquid crystal display device according to Example 3 satisfies $172.05X^{0.3979} \leq Y \leq 640.09X^{0.3122}$ with $X \geq 90$, where X (unit: lx) is defined as the environmental illuminance detected by the illuminance sensor, and Y (unit: nit) is defined as the luminance of the backlight, adjusted by the display controller. This applies in a case where the reflectance of the liquid crystal panel is higher than 1.3% and 1.8% or lower.

What is claimed is:

1. A liquid crystal display device comprising:
    a liquid crystal panel;
    a backlight;
    an illuminance sensor that detects an environmental illuminance in a surrounding environment of the liquid crystal panel; and
    a display controller configured to increase a luminance of the backlight as the environmental illuminance detected by the illuminance sensor increases,
    the liquid crystal display device is a transmission liquid crystal display device,
    the liquid crystal panel including, in order toward the backlight, an antireflection layer, a first linearly polarizing plate, a first λ/4 retardation layer, a first substrate, a second λ/4 retardation layer, a liquid crystal layer, a second substrate, and a second linearly polarizing plate,
    an in-plane slow axis of the first λ/4 retardation layer and a transmission axis of the first linearly polarizing plate forming an angle of 42° to 48°,
    the liquid crystal panel having a reflectance of higher than 0% and 0.5% or lower in irradiating the liquid crystal panel with light from an antireflection layer side, and
    the liquid crystal display device satisfying $39.002X^{0.4225} \leq Y \leq 220.42X^{0.2918}$ with $X \geq 10000$, where X (unit: lx) is defined as the environmental illuminance detected by the illuminance sensor, and Y (unit: nit) is defined as the luminance of the backlight, adjusted by the display controller.

2. The liquid crystal display device according to claim 1, wherein the liquid crystal panel is a liquid crystal panel in a horizontal electric field mode.

3. A liquid crystal display device comprising:
    a liquid crystal panel;
    a backlight;
    an illuminance sensor that detects an environmental illuminance in a surrounding environment of the liquid crystal panel; and
    a display controller configured to increase a luminance of the backlight as the environmental illuminance detected by the illuminance sensor increases,
    the liquid crystal display device is a transmission liquid crystal display device,
    the liquid crystal panel including, in order toward the backlight, an antireflection layer, a first linearly polarizing plate, a first λ/4 retardation layer, a first substrate, a second λ/4 retardation layer, a liquid crystal layer, a second substrate, and a second linearly polarizing plate,
    an in-plane slow axis of the first λ/4 retardation layer and the transmission axis of the first linearly polarizing plate forming an angle of 42° to 48°,
    the liquid crystal panel having a reflectance of higher than 0.5% and 1.3% or lower in irradiating the liquid crystal panel with light from an antireflection layer side, and
    the liquid crystal display device satisfying $136.17X^{0.3891} \leq Y \leq 477.54X^{0.3086}$ with $X \geq 10000$, where X (unit: lx) is defined as the environmental illuminance detected by the illuminance sensor, and Y (unit: nit) is defined as the luminance of the backlight, adjusted by the display controller.

4. The liquid crystal display device according to claim 3, wherein the liquid crystal panel is a liquid crystal panel in a horizontal electric field mode.

5. A liquid crystal display device comprising:
a liquid crystal panel;
a backlight;
an illuminance sensor that detects an environmental illuminance in a surrounding environment of the liquid crystal panel; and
a display controller that adjusts a luminance of the backlight, based on the environmental illuminance detected by the illuminance sensor,
the liquid crystal panel including, in order toward the backlight, an antireflection layer, a first linearly polarizing plate, a first $\lambda/4$ retardation layer, a first substrate, a second $\lambda/4$ retardation layer, a liquid crystal layer, a second substrate, and a second linearly polarizing plate,
the liquid crystal panel having a reflectance of higher than 1.3% and 1.8% or lower in irradiating the liquid crystal panel with light from an antireflection layer side, and
the liquid crystal display device satisfying $172.05X^{0.3979} \leq Y \leq 640.09X^{0.3122}$ with $X \geq 90$, where X (unit: lx) is defined as the environmental illuminance detected by the illuminance sensor, and Y (unit: nit) is defined as the luminance of the backlight, adjusted by the display controller.

6. The liquid crystal display device according to claim 5, wherein the liquid crystal panel is a liquid crystal panel in a horizontal electric field mode.

* * * * *